United States Patent
Griswold

(10) Patent No.: US 8,933,187 B2
(45) Date of Patent: Jan. 13, 2015

(54) SELF-CROSSLINKING SILICONE PRESSURE SENSITIVE ADHESIVE COMPOSITIONS, PROCESS FOR MAKING AND ARTICLES MADE THEREOF

(75) Inventor: Roy Melvin Griswold, Ballston Spa, NY (US)

(73) Assignee: Momentive Performance Material Inc., Waterford, NY (US)

( * ) Notice: Subject to any disclaimer, the term of this patent is extended or adjusted under 35 U.S.C. 154(b) by 169 days.

(21) Appl. No.: 13/314,945

(22) Filed: Dec. 8, 2011

(65) Prior Publication Data

US 2013/0150535 A1 Jun. 13, 2013

(51) Int. Cl.
 *C08G 77/12* (2006.01)
 *C08G 77/20* (2006.01)

(52) U.S. Cl.
 USPC .............................................. 528/31; 528/32

(58) Field of Classification Search
 CPC ........ C08G 77/70; C08G 77/02; C08G 77/12; C08G 77/20; C08L 83/02; C08L 83/04
 USPC ..................................................... 528/31, 32
 See application file for complete search history.

(56) References Cited

U.S. PATENT DOCUMENTS

| | | |
|---|---|---|
| 3,159,601 A | 12/1964 | Ashby |
| 3,159,662 A | 12/1964 | Ashby |
| 3,220,970 A | 11/1965 | Carlstrom et al. |
| 3,344,111 A | 9/1967 | Chalk |
| 3,418,731 A | 12/1968 | Anciaux |
| 3,445,420 A | 5/1969 | Kookootsedes |
| 3,461,185 A | 8/1969 | Brown |
| 3,516,946 A | 6/1970 | Modic |
| 3,814,730 A | 6/1974 | Karstedt |
| 3,882,083 A | 5/1975 | Berger et al. |
| 3,884,866 A * | 5/1975 | Jeram et al. ................... 523/203 |
| 3,983,298 A | 9/1976 | Hahn et al. |
| 3,989,667 A | 11/1976 | Lee et al. |
| 4,029,629 A | 6/1977 | Jeram |
| 4,043,977 A | 8/1977 | deMontigny et al. |
| 4,061,609 A | 12/1977 | Bobear |
| 4,256,870 A | 3/1981 | Eckberg |
| 4,337,332 A | 6/1982 | Melancon et al. |
| 4,347,346 A | 8/1982 | Eckberg |
| 4,465,818 A | 8/1984 | Shirahata et al. |
| 4,472,563 A | 9/1984 | Chandra et al. |
| 4,476,166 A | 10/1984 | Eckberg |
| 4,510,094 A | 4/1985 | Drahnak |
| 4,533,575 A | 8/1985 | Melancon |
| 4,562,096 A | 12/1985 | Lo et al. |
| 4,774,297 A | 9/1988 | Murakami et al. |
| 4,988,779 A | 1/1991 | Medford et al. |
| 5,169,727 A | 12/1992 | Boardman |
| 5,248,739 A | 9/1993 | Schmidt et al. |
| 5,506,289 A | 4/1996 | McDermott et al. |
| 5,576,110 A | 11/1996 | Lin et al. |
| 6,466,532 B1 | 10/2002 | Ko |
| 2005/0113513 A1 | 5/2005 | Grisworld |

FOREIGN PATENT DOCUMENTS

| | | |
|---|---|---|
| EP | 2272934 A1 | 1/2011 |
| JP | 8209104 | 8/1996 |

\* cited by examiner

*Primary Examiner* — Kuo-Liang Peng
(74) *Attorney, Agent, or Firm* — Hoffman Warnick LLC

(57) ABSTRACT

Disclosed herein are self-crosslinking compositions containing a hydrosilation catalyst and the reaction product of a mixture comprising (i) a resinous copolymer having both silicon-bonded hydrogen and silanol groups, and (ii) one or more vinyl-functional polyorganosiloxanes. These compositions have stable post-cure adhesive properties and are suitable for use in electronic applications.

24 Claims, No Drawings

SELF-CROSSLINKING SILICONE PRESSURE SENSITIVE ADHESIVE COMPOSITIONS, PROCESS FOR MAKING AND ARTICLES MADE THEREOF

FIELD OF THE INVENTION

The present invention relates to self-crosslinking silicone pressure sensitive adhesive coating compositions. More particularly, the present invention relates to addition curable silicone compositions that have controllable crosslinking, thus stable post-cure properties. The present invention also relates to processes of making the compositions, and to articles containing a substrate having the compositions adhered thereto.

BACKGROUND OF THE INVENTION

Pressure sensitive adhesives (PSA), as defined by the Pressure-Sensitive Tape Council, are materials having aggressive and permanent tack, adhering with minimal contact pressure, requiring no activation by any energy source, having sufficient shear resistance under a load and sufficient cohesive strength to be cleanly removed from adherents. There are several classes of pressure sensitive adhesives, silicones being one of them.

Typically silicone PSAs cure either by peroxide radicals or through an addition reaction between a vinyl containing siloxane oligomer/polymer and a hydride containing siloxane oligomer. Peroxide curing tends to produce by-products that may affect the optical clarity of the adhesives. Accordingly, peroxide curable PSAs are not suitable for use in construction of electronic displays, such as cell phones, GPS navigation, and television displays, where optical clarity is essential. Compared with peroxide curable PSAs, addition curable silicone PSAs do not normally contain by-products that affect optical clarity of the adhesives, thus being suitable for use in construction of multi-layer laminate electronic displays.

Addition curable silicone PSAs are known in the art and have been described for example in U.S. Pat. Nos. 3,983,298; 4,774,297; 4,988,779; 5,169,727; 5,248,739; 6,466,532; 5,576,110; and JP 8209104. However, these prior art addition curable PSAs relied on multi-component blends to achieve required adhesive properties of tack, peel adhesion, and cohesive strength. As such, the requisite crosslinking has been unpredictable and the adhesive properties of the PSAs upon cure have been unstable.

Attempts have been made to solve the problems associated with the prior art addition curable silicone PSAs. Illustratively, US 20050113513 to Griswold discloses an addition curable silicone PSA composition that contains a self-crosslinkable component and a hydrosilation catalyst. According to Griswold, the self-crosslinkable component can be made by (1) condensing an aromatic soluble silicone resin or resinous copolymer with an alkenyl containing polydiorganosiloxane, and (2) reacting the condensation reaction product with a silylating agent to cap the silanol groups remaining from the condensation reaction to form silicon-bonded hydrogen groups using as an example 1,1,3,3-tetramethyldisilazane.

However, one drawback of the process is that after the condensation reaction, not all remaining silanol groups are accessible to silylation because of steric hindrance. Further, as shown in examples 4 and 5 of the '513 publication, after the addition reaction, the silicon-hydride concentrations were high due to the hydride group being sterically hindered for the hydrosilation reaction with the vinyl groups on the polymer/oligomer. This limitation prevents an effective means for controlling crosslink density and therefore cohesive strength for a pressure sensitive adhesive. Furthermore, the residual silicon-hydride groups affect the stability of pressure adhesive properties such as peel adhesion and tack upon storage. In addition, residual hydride after hydrosilation cure can result in out gassing in a laminate construction being observed as bubbles.

Several other attempts to resolve the defects in the prior art were also unsuccessful. Accordingly, there is a continuing need in the industry for addition curable silicone pressure sensitive adhesive compositions that have controllable crosslinking and stable post-cure adhesive properties.

SUMMARY OF THE INVENTION

One aspect of the present invention relates to a silicone pressure sensitive adhesive composition, which has stable adhesive properties upon cure. The composition comprises
(A) a reaction product of a mixture comprising
(i) a resin comprising $R^1_3SiO_{1/2}$ ("M") units and $SiO_{4/2}$ ("Q") units
wherein each $R^1$ is independently a monovalent hydrocarbon radical having from 1 to 6 carbon atoms;
wherein the copolymer comprises from about 70 mol % to about 99 mol % of hydroxyl radicals and from about 1 mol % to about 30 mol % of hydride radicals, based on the total moles of the hydroxyl and the hydride radicals of the resin;
wherein the hydroxyl radicals are bonded directly to the silicon atoms of the Q units; and the hydride radicals are bonded to the silicon atoms of the Q units via —OSiHR$^5_2$ radicals, wherein $R^5$ is a monovalent hydrocarbon radical having from 1 to 6 carbon atoms; and
(ii) one or more vinyl-functional polyorganosiloxanes; and
(B) a hydrosilation catalyst.

In another aspect, the present invention relates to a process for preparing the silicone pressure sensitive adhesive composition of the present invention. The process includes the steps of:
(i) reacting a MQ resin with a capping agent being $R^6_a SiX_{4-a/2}$ to provide a partially end-capped MQ resin,
wherein the MQ resin consists essentially of $R^1_3SiO_{1/2}$ ("M") units and $SiO_{4/2}$ ("Q") units, each $R^1$ is independently a monovalent hydrocarbon radical having from 1 to 6 carbon atoms, the MQ resin comprises from about 1% to about 4% by weight, based on the total weight of the MQ resin, of hydroxyl radicals bonded to the silicon atoms of the Q units, and the MQ resin does not contain hydride radicals;
wherein each $R^6$ is independently hydrogen or a monovalent hydrocarbon radical having from 1 to 6 carbon atoms with the proviso that at least one $R^6$ is hydrogen, X is N, Cl, or O, and a is from about 0.5 to about 2.0;
wherein the partially end-capped MQ resin contains from about 70 mol % to about 99 mol % of hydroxyl radicals and from about 1 mol % to about 30 mol % of hydride radicals based on the total moles of the hydroxyl and the hydride radicals of the partially end-capped MQ resin;
wherein the hydroxyl radicals are bonded directly to the silicon atoms of the Q units, and the hydride radicals are bonded to the silicon atoms of the Q units via —OSiHR$^5_2$ radicals, wherein $R^5$ is a monovalent hydrocarbon radical having from 1 to 6 carbon atoms;
(ii) reacting the partially-end capped MQ resin from step (i) with one or more vinyl-functional polyorganosiloxanes in the presence of an organic amine catalyst to provide an intermediate product; and (iii) contacting the intermediate product from step (ii) with a hydrosilation catalyst thus preparing the silicone pressure sensitive adhesive composition of the present invention.

Alternatively, the silicone pressure sensitive adhesive compositions of the present invention can be prepared by a process comprising the steps of (a) reacting a mixture comprising (i) a MQ resin consisting essentially of $R^1_3SiO_{1/2}$ ("M") units and $SiO_{4/2}$ ("Q") units, wherein each $R^1$ is independently a monovalent hydrocarbon radical having from 1 to 6 carbon atoms, the MQ resin comprises from about 1% to about 4% by weight, based on the total weight of the MQ resin, of hydroxyl radicals bonded to the silicon atoms of the Q units, and the MQ resin does not contain hydride radicals;

(ii) a capping agent being $R^6_a SiX_{4-a/2}$, wherein each $R^6$ is independently hydrogen or a monovalent hydrocarbon radical having from 1 to 6 carbon atoms with the proviso that at least one $R^6$ is hydrogen, X is N, Cl, or O, and a is from about 0.5 to about 2.0; and (iii) one or more vinyl-functional polyorganosiloxanes to provide an intermediate product; and (b) contacting the intermediate product of step (a) with a hydrosilation catalyst thus preparing the silicone pressure sensitive adhesive composition of the invention.

The present invention also relates to an article containing a substrate having the silicone pressure sensitive adhesive composition of the invention adhered thereto.

These and other aspects will become apparent upon reading the following detailed description of the invention.

DETAILED DESCRIPTION OF THE INVENTION

Component (A) of the compositions of the present invention is a reaction product of a mixture comprising (i) a resin containing both silicon-bonded hydrogen and silanol groups and (ii) one or more vinyl-functional polyorganosiloxanes. Suitable resins comprise $R^1_3SiO_{1/2}$ ("M") units and $SiO_{4/2}$ ("Q") units wherein each $R^1$ is independently a monovalent hydrocarbon radical having from 1 to 6 carbon atoms. Examples of radicals represented by $R^1$ include alkyl radicals such as methyl, ethyl, and isopropyl; cycloaliphatic radicals such as cyclopentyl and cyclohexanyl; olefinic radicals such as vinyl and allyl, and phenyl radical. Advantageously, at least 95% by weight of all $R^1$ groups are alkyl groups. In one embodiment, $R^1$ is methyl. In the resin (A)(i), the molar ratio of M units to Q units is from about 0.6 to about 1.2 inclusive.

The resin (A)(i) also comprises from about 70 mol % to about 99 mol %, advantageously from about 75 mol % to about 99 mol %, of hydroxyl radicals, and from about 1 mol % to about 30 mol %, advantageously from about 5 mol % to about 25 mol % of hydride radicals, based on the total moles of the hydroxyl and hydride radicals of the resin. The hydroxyl radicals are bonded directly to the silicon atom of the Q units. The hydride radicals are bonded to the silicon atoms of the Q units via —$OSiHR^5_2$ radicals, wherein each $R^5$ is independently a monovalent hydrocarbon radical having from 1 to 6 carbon atoms.

The resin (A)(i) can be prepared by reacting a MQ resin with a silanol capping agent. Suitable MQ resins consist essentially of $R^1_3SiO_{1/2}$ ("M") units and $SiO_{4/2}$ ("Q") units wherein each $R^1$ is independently a monovalent hydrocarbon radical having from 1 to 6 carbon atoms. In addition, suitable MQ resins comprise from about 1% to about 4% by weight, based on the total weight of the MQ resin, of hydroxyl radicals bonded to the silicon atoms of the Q units. The MQ resins do not contain hydride radicals.

Suitable capping agents are represented by $R^6_a SiX_{4-a/2}$ wherein each $R^6$ is independently hydrogen or a monovalent hydrocarbon radical having from 1 to 6 carbon atoms with the proviso that at least one $R^6$ is hydrogen, X is N, Cl, or O, and a is from about 0.5 to about 2.0. The capping agents react with the hydroxyl groups in the Q units to provide silicon-hydride functionality of the resin (A)(i).

Exemplary capping agents include, but are not limited to, silazanes, disilazanes, and polysilazanes, organohydrogen chlorosilanes, hydrogen functional siloxanes, and combinations thereof. Examples of silazanes, disilazanes and polysilazanes include 1,2,3,4,5,6-hexamethylcyclotrisilazane, 1,1,3,3-tetramethyldisilazane, KiON® Corporation S, KiON® Corporation VL20, KiON® Corporation ML33/C33, KiON® Corporation CERASET, (N,N)-dimethylamino) dimethylsilane, ethyldichlorosilane, dimethylethoxysilane, dimethylaminomethylethoxysilane, dimethylchlorosilane, diphenylchlorosilane, ethylbis(trimethylsiloxy)silane, hexyldichlorosilane, methyldichlorosilane, phenyldichlorosilane, phenyldiethoxysilane, phenylmethylchlorosilane, 1,3,5,7-tetraethyl-2,4,6,-8-tetramethylcyclotetrasilazane, 1,1,3,3-tetramethyldisiloxane, and 1,2,3-triethyl-2,4,6-trimethylcyclotrisilazane.

Component (A)(ii) is an alkenyl-containing polydiorganosiloxane or a mixture of alkenyl-containing polydiorganosiloxanes. Suitable alkenyl-containing polydiorganosiloxanes are advantageously polydiorganosiloxanes of the following general formula $R^2_2R^3SiO(R^2_2SiO)_x(R^2_2R^4SiO)_ySiR^3R^2_2$ (I) wherein each $R^2$ is independently an alkyl group having from 1 to about 10 carbon atoms such as methyl, ethyl, and propyl; a cycloaliphatic group such as cyclohexanyl or an aryl group such as phenyl; $R^3$ is a hydroxyl or an alkenyl or an alkyloxyalkenyl group having from 1 to about 10 carbon atoms including alpha-alkenyls such as vinyl, allyl, propenyl, butenyl, pentenyl, hexenyl and the like; $R^4$ is either $R^2$ or an alkenyl group having from 1 to about 10 carbon atoms including α-alkenyls such as vinyl, allyl, propenyl, butenyl, pentenyl, hexenyl and the like. Trace units of $R^2_3SiO_{1/2}$ units, $R^2SiO_{3/2}$ units and $SiO_{4/2}$ units are permissible. The sum of x and y is at least about 520 to give a viscosity of about 3,000 centipoises at 25° C., and advantageously at least 10,000 centipoises at 25° C. Advantageously the polydiorganosiloxanes (A)(ii) are essentially free of cyclic materials with the exception of trace quantities of macrocyclic polydiorganosiloxanes, which are non-volatile at 150° C. and atmospheric pressure. Furthermore, the polydiorganosiloxanes (A)(ii) can be homopolymers or copolymers or their several mixtures of formula (I). Exemplary alkenyl-containing polydiorganosiloxanes (A)(ii) include but are not limited to alkenyl-containing polydimethylsiloxane, alkenyl-containing poly(dimethyl-co-dimethylphenyl)siloxane, and alkenyl-containing poly(dimethyl-co-diphenyl)siloxane. Advantageously the alkenyl group is vinyl.

Resin (A)(i) can react with vinyl-functional polyorganosiloxane (A)(ii) in the presence of an organic amine catalyst to form component (A). The organic amine catalyst which promotes the reaction between resin (A)(i) and vinyl-containing polyorganosiloxane (A)(ii) is not particularly limited. It can be a by-product of a capping agent or a silane coupling agent. For example, dimethyldiisopropylaminosilane gives isopropylamine as a by-product, which can be used as the amine catalyst.

Component (A) of the composition of the present invention contains hydride groups and vinyl groups in one molecule. Under curing conditions and with the presence of a hydrosilation catalyst, it can cure to form PSA compositions having stable adhesive properties.

Component (B) of the composition of the present invention is a catalyst which promotes the hydrosilation reaction. Useful catalysts for facilitating the hydrosilation curing reaction include precious metal catalysts such as those which use ruthenium, rhodium, palladium, osmium, iridium, and platinum, and complexes of these metals. Examples of suitable hydrosilation catalysts for use in the present invention are disclosed, for example, in U.S. Pat. Nos. 3,159,601; 3,159,662 (Ashby); 3,220,970 (Lamoreax); 3,814,730 (Karstedt); 3,516,946 (Modic); 4,510,094; and 4,029,629 (Jeram); all of the foregoing patents being hereby incorporated by reference herein in their entireties.

Advantageously, the hydrosilation catalyst used in the present invention is a platinum-containing catalyst. Suitable platinum-containing hydrosilation catalysts include any of the well known forms of platinum that are effective for catalyzing the reaction of silicon-bonded hydrogen atoms with silicon-bonded vinyl groups, such as finely divided metallic platinum, platinum on a finely divided carrier such as alumina, compounds of platinum such as chloroplatinic acid and complexes of platinum compounds.

The amount of catalyst component that is used in the compositions of this invention is not narrowly limited as long as there is a sufficient amount to accelerate a room temperature reaction between the silicon-bonded hydrogen atoms of component (A) with the silicon-bonded olefinic hydrocarbon radicals of component (A). The exact necessary amount of said catalyst component will depend upon the particular catalyst, the composition and the amount of component (A). The said amount can be as low as one part by weight of platinum for every one million parts by weight of component (A). In one embodiment, the amount of platinum-containing catalyst component to be used is sufficient to provide from 5 to 500 parts by weight platinum per one million parts by weight of component (A).

Optionally, hydrosilation inhibitors can be added to extend the adhesive coating viscosity for extended bath life of the adhesion compositions. Inhibitors for the platinum metal group catalysts are well known in organosilicone art. Examples include various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420; 4,347,346 and 5,506,289; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, and conjugated ene-ynes. U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; half esters and half amides, U.S. Pat. No. 4,533,575; and various salts, such as U.S. Pat. No. 3,461,185. It is believed that the compositions of this invention can comprise an inhibitor from any of these classes of inhibitors.

For example, the inhibitors may be selected from the group consisting of ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated ene-ynes, hydroperoxides, ketones, sulfoxides, amines, phosphines, phosphites, nitriles, and diaziridines. Preferred inhibitors for the compositions of this invention are the maleates and alkynyl alcohols.

Optionally the adhesive compositions of the invention can contain additional ingredients to adjust the properties of the adhesives. In one embodiment, the composition contains a reactive diluent selected from the group consisting of alpha-olefins, vinyl ethers, vinyl carboxylates, mono-vinyl polysiloxanes, vinyl cycloaliphatics, vinyl cyclic olefinic compounds, vinyl-functional MQ resins and combinations thereof. Examples of suitable reactive diluents include but are not limited to alpha-olefins such as octadecene, decene, dodecene, tetradecene, vinylcyclohexane, vinylcyclohexene; vinyl ethers such as butyl vinyl ether, dodecyl vinyl ether, 2-ethylhexyl vinyl ether, cyclohexyl vinyl ether, 1,4-butandiol vinyl ether; vinyl carboxylates such as vinylpropionate; mono-vinyl polysiloxanes such as poly(dimethylsiloxane), vinyl, n-butyl terminated.

In another embodiment, the adhesive composition of the present invention further comprises at least an additional component selected from the group consisting of organohydrogenpolysiloxanes, MQ resins, vinyl-functional polyorganosiloxanes, and combinations thereof.

Suitable MQ resins include MQ resins consisting essentially of $R^1_3SiO_{1/2}$ ("M") units and $SiO_{4/2}$ ("Q") units wherein each $R^1$ is independently a monovalent hydrocarbon radical having from 1 to 6 carbon atoms. In one embodiment, the MQ resins comprise from about 1% to about 4% by weight, based on the total weight of the MQ resin, of hydroxyl radicals bonded to the silicon atoms of the Q units. Suitable MQ resins also include vinyl-functional MQ resins such as $M^{vi}MQ$ or $MD^{vi}Q$ resins wherein M is $R^7_3SiO_{1/2}$, $M^{vi}$ is $R^8_3SiO_{1/2}$, $D^{vi}$ is $R^8_2SiO_{2/2}$, and Q is $SiO_{4/2}$, wherein each $R^7$ is independently a monovalent hydrocarbon radical having from 1 to 6 carbon atoms, each $R^8$ is independently $R^7$, an alkenyl radical having from 2 to 6 carbon atoms or an alkenylhydrocarbonoxy radical having from 2 to 6 carbon atoms with the proviso that at least one $R^8$ is an alkenyl radical having from 2 to 6 carbon atoms or an alkenylhydrocarbonoxy radical having from 2 to 6 carbon atoms.

Suitable vinyl-functional polyorganosiloxanes are the same as (A)(ii) described above.

Suitable organohydrogenpolysiloxanes can be selected from the group of compounds consisting of:

$MD_eD^H_jM$, $MD^H_jM$, $MD_eD^H_jM^H$, $M^HD_eD^H_jM$, $M^HD_eM^H$, and $M^H_eQ_f$ wherein $M=R_3SiO_{1/2}$, $M^H=H_gR_{3-g}SiO_{1/2}$, $D=RRSiO_{2/2}$, $D^H=R^HHSiO_{2/2}$ and $Q=SiO_{4/2}$, wherein each R in M, $M^H$, D, and $D^H$ is independently a monovalent hydrocarbon having from one to forty carbon atoms, and wherein the subscript g is 1 and subscripts e and f may be zero or positive whereby the sum of e and f ranges from about 10 to about 100 subject to the limitation that the sum of f and g is two or greater. Advantageously R is methyl or phenyl.

The silicone pressure sensitive adhesive composition of the invention can be made by a process comprising the steps of (i) reacting a MQ resin with a capping agent, to provide a partially end-capped MQ resin containing hydride radicals, (ii) reacting the partially-end capped MQ resin from step (i) with one or more vinyl-functional polyorganosiloxanes in the presence of an organic amine catalyst to provide an intermediate product, and (iii) contacting the intermediate product from step (ii) with a hydrosilation catalyst thus making the silicone pressure sensitive adhesive composition.

Alternatively, the silicone pressure sensitive adhesive composition of the present invention can be prepared by a process containing the steps of (a) reacting a mixture comprising (i) a MQ resin, (ii) a capping agent, and (iii) one or more vinyl-functional polyorganosiloxane to provide an intermediate product; and (b) contacting the intermediate product of step (a) with a hydrosilation catalyst.

In connection with the above described processes, the MQ resin consists essentially of $R^1_3SiO_{1/2}$ ("M") units and $SiO_{4/2}$ ("Q") units, each $R^1$ is independently a monovalent hydrocarbon radical having from 1 to 6 carbon atoms. In addition, the MQ resin comprises from about 1% to about 4% by weight, based on the total weight of the MQ resin, of hydroxyl radicals bonded to the silicon atoms of the Q units. The MQ resin does not contain hydride radicals.

The capping agents have been described above. It can be $R^6 \cdot SiX_{4-a/2}$ wherein each $R^6$ is independently H or a monovalent hydrocarbon radical having from 1 to 6 carbon atoms with the proviso that at least one $R^6$ is hydrogen, X is N, Cl, or O, and a is from about 0.5 to 2.0. The partially end-capped MQ resins and vinyl-functional polyorganosiloxane are the same as component (A)(i) and (A)(ii) discussed above.

Optionally, the reaction mixture of step (i) or step (a) contains a coupling agent. Coupling agent can be included to alter the cohesive property of an adhesive. Suitable coupling agents include but are not limited to compositions of the structure $R^9_2SiX_{4/2}$ wherein $R^9$ is a monovalent hydrocarbon radical having from 1 to 6 carbon atoms, X is N, Cl, or O. Illustrative coupling agents include bis(diethylamino)dimethylsilane, bis(dimethylamino)dimethylsilane, bis(dimethylamino)diethylsilane, bis(diisopropylamino)dimethylsilane, dimethyldichlorosilane, diethyldichlorosilane, dimethoxydimethylsilane, and diethoxydimethylsilane.

In one embodiment, in the reaction mixture of step (a), the MQ resin is present in an amount of from about 48.0 wt % to about 75.8 wt %, the capping agent is present in an amount of from about 0.56 wt % to about 1.81 wt %, the coupling agent is present in an amount of from about 0.0 wt % to about 0.08 wt %, and the vinyl-functional polyorganosiloxane is present in an amount of from about 22.3 wt % to about 51.1 wt % based on the total weight of the MQ resin, the silanol capping agent, the coupling agent and the vinyl-functional polyorganoxiloxane.

Advantageously in the reaction mixture of step (a), the MQ resin is present in an amount of from about 48.0 wt % to about 65.0 wt %, the capping agent is present in an amount of from about 0.65 wt % to about 1.50 wt %, the coupling agent is present in an amount of from about 0.02 wt % to about 0.05 wt %, and the vinyl-functional polyorganosiloxane is present in an amount of from about 25.0 wt % to about 45.0 wt % based on the total weight of the MQ resin, the silanol capping agent, the coupling agent and the vinyl-functional polyorganoxiloxane.

The silicone pressure sensitive adhesive compositions can be cured at about 80 to about 150° C., preferably about 80 to about 130° C. The silicone pressure sensitive adhesive compositions of the invention have controllable crosslinking density and stable post-cure properties. They are useful as pressure sensitive adhesives and will readily stick to a solid substrate, whether flexible or rigid. The composition can be applied to the surface of the substrate by any suitable coating means such as rolling, spreading, spraying and the like; then cured.

The substrate may be any known solid material such as glass, metals, porous materials, leather, fabrics, organic polymeric materials, fluorocarbon polymers, silicone elastomers, silicone resins, polystyrene, polyamides, polyimides, polyesters and acrylic polymers, painted surfaces, siliceous materials, and the like.

In one embodiment, the present invention provides an article containing a substrate having the pressure sensitive adhesive composition of the invention adhered thereto. Exemplary articles include, but are not limited to, pressure sensitive tapes, labels, transfer films, electronic devices such as cell phones, GPS navigation and television displays or electronic components. In one embodiment, the adhesive composition is cured.

The following examples are intended to illustrate, but in no way limit the scope of the present invention. All parts and percentages are by weight and all temperatures are in degrees Celsius unless explicitly stated otherwise.

EXAMPLES

General Considerations

M=trimethylsiloxy $Me_3SiO_{1/2}$
$M^{Vi}$=dimethylvinylsiloxy $Me_2ViSiO_{1/2}$
D=dimethylsiloxy $Me_2SiO_{2/2}$
$D^{Vi}$=methylvinylsiloxy $MeViSiO_{2/2}$
$D^{Phenyl}$=diphenylsiloxy $Phenyl_2SiO_{2/2}$
T=methylsiloxy $MeSiO_{3/2}$
Q=siloxy $SiO_{4/2}$
Calculations:

$$\text{Initial moles of resin OH@100\% solids} = \frac{\text{Grams resin@100\% solids} \times \% \text{OH}/100 \times 1 \text{ mole OH}}{17 \text{ grams OH}}$$

$$\text{Hydride moles H} = \frac{\text{Grams composition@100\% solids} \times \text{grams resin in composition} \times \text{ppm H@100\% solids} \times 1 \text{ mole H}}{(\text{grams resin} + \text{grams polymer of composition}) \cdot 1{,}000{,}000 \text{ ppm} \times \text{gram}}$$

Residual moles OH of resin=Initial moles of Resin OH−Hydride moles H

Mole % of OH and hydride is calculated on the total moles of OH and hydride.

The SiH/Vi ratio is a molar ratio calculated by dividing the total moles of SiH functional groups in the adhesive composition by the total moles of the Vi functional groups in the adhesive composition.

All viscosities were measure at 25° C. unless otherwise noted. All PSA compositions were bar coated onto 25-micron polyimide film, air dried for 10 minutes then cured 5 minutes at 150° C. except where noted. Peel adhesion was per PSTC 101, 180 degree, 300 mm/minute. Catalyst used was Karstedt in $M^{Vi}D_{115}M^{Vi}$ unless otherwise noted in the examples.

Example 1

This example illustrates a two step process to prepare addition curable PSA. In the process, the silanol MQ resin is functionalized to a silanol-silicon hydride functional MQ resin first, then the functionalized MQ resin is reacted with vinyl-functional polyorganosiloxane to produce the PSA.

A. Silanol-Silicon Hydride Functional MQ Resin Preparation 353.4 g of MQ resin, M/Q=0.7 and 2.70 wt % OH (0.3401 moles OH), as a 60.6 wt % solids in toluene was added to a reaction vessel under nitrogen atmosphere. With agitation 24.1 g of a 20-wt % 1,1,3,3-tetramethyldisilazane in toluene solution was slowly added. After one-hour agitation $Si^{29}$ NMR analysis of a sample showed 0.82/0.03/1.00 for $M/M^H/Q^{OH}$ for the silanol-silicon hydride resin at 100% solids resin. Hydride at 100% solids was 307 ppm using a gasometrical method. Using the above calculation method the silanol-silicon hydride resin had 0.2744 moles OH (80.7 mole %) and 0.0658 moles H (19.3 mole % H).

B. Pressure Sensitive Adhesive Preparation 220.0 g of silanol-silicon hydride functional MQ resin of A) above was added along with 100.0 g $MD^{Vi}_{6750}D^{Vi}_{13}M$ (100 wt % of polyorganosiloxane polymer) and 100.0 g toluene to a 1-liter reactor. Resin to polymer ratio was 1.27. The mixture was reflux dried for 1 hour, then cooled below reflux temperature at which time 0.18 g of bis(diisopropylamino)dimethylsilane was added then returned to reflux for 1 hour longer. The excess base was neutralized with phosphoric acid to 0-10 ppm as acid, then excess toluene was removed, then the resulting composition was cooled to room temperature. The adhesive composition viscosity was 73,400 cps, 57.1% solid at 25° C., 63 ppm hydride on a 100% solids basis. The SiH/Vi ratio was 2.4. A 25.0 g sample was removed and 25 ppm platinum on solids basis was added, then bar coated onto 25-micron polyimide film at 45 microns as dry film thickness (dft). Cure was for 5 minutes at 105° C. Pressure sensitive adhesive properties were 583 g/in peel adhesion.

C. Silanol-Silicon Hydride Functional MQ Resin Preparation 500.0 g of MQ resin, M/Q=0.7 and 2.00 wt % OH (0.3565 moles OH) as a 60.6 wt % solids in toluene was added to a reaction vessel under nitrogen atmosphere. With agitation 7.3 g of dimethylhydrogenchlorosilane was slowly added. After 1 hour agitation the solution was refluxed for one hour and residual acid (HCl) was determined to be 17 ppm. NMR analysis of a sample confirmed that MQ resin silanol groups were partially capped yielding a silanol-silicon hydride resin. The hydride at 100% solids was 290 ppm using a gasometrical method. Using the above calculation method the silanol-silicon hydride resin had 0.2686 moles OH (75.4 mole %) and 0.0879 moles H (24.6 mole % H).

D. Pressure Sensitive Adhesive Preparation 458.0 g of silanol-silicon hydride functional MQ resin of B) above was added along with 32.1 g of $M^{Vi}D^{Vi}_7D_{3200}M^{Vi}$ (28 wt % of polyorganosiloxane polymer), 59.5 g of $M^{Vi}D_{800}M^{Vi}$ (52.0 wt % of polyorganosiloxane polymer), 22.9 g of $M^{Vi}_3D_{95}T_{2.5}$ (20.0 wt % of polyorganosiloxane polymer), 0.1 g isopropylamine, and 0.11 g bis(diisopropylamino)dimethylsilane to a 1-liter reactor. Resin to polymer ratio was 2.6. The mixture was reflux dried for 1 hour then cooled. The excess base was neutralized with phosphoric acid to 0-10 ppm as acid. The adhesive composition viscosity was 640 cps. It contained 74.9% solid at 25° C. and 136 ppm hydride on a 100% solids basis. The SiH/Vi ratio was 4.8. A 25.0 g sample was removed and 25 ppm platinum on solids basis using a 1000 ppm as platinum Ashby catalyst in toluene solution was added, then bar coated onto 45-micron polyester film at 125 microns as dry film thickness (dft). Cure was for 5 minutes at 135° C. Pressure sensitive adhesive properties were: >4,000 g/in peel adhesion (limit of test instrument), Polyken Probe Tack, 100 g/cm², 1-second dwell was <50 g/cm².

E. Silanol-Silicon Hydride Functional MQ Resin Preparation 500.0 g of MQ resin, M/Q=0.7 and 2.00 wt % OH (0.3565 moles OH) as a 60.6 wt % solids in toluene was added to a reaction vessel under nitrogen atmosphere. With agitation 4.5 g of 1,1,3,3-tetramethyldisiloxane, and 0.5 g concentrated hydrochloric acid was added. After 1 hour agitation the solution was refluxed for one hour and residual acid (HCl) was determined to be 5 ppm. NMR analysis of a sample confirmed that MQ resin silanol groups were partially capped yielding a silanol-silicon hydride resin. The hydride at 100% solids was 62 ppm using a gasometrical method. Using the above calculation method the silanol-silicon hydride resin had 0.3377 moles OH (94.7 mole %) and 0.0188 moles H (5.3 mole % H).

F. Pressure Sensitive Adhesive Preparation 458.0 g of silanol-silicon hydride functional MQ resin of E) above was added along with 32.1 g of $M^{Vi}D^{Vi}_7D_{3200}M^{Vi}$ (28 wt % of polyorganosiloxane polymer), 59.5 g of $M^{Vi}D_{800}M^{Vi}$ (52.0 wt % of polyorganosiloxane polymer), 22.9 g of $M^{Vi}_3D_{95}T_{2.5}$ (20.0 wt % of polyorganosiloxane polymer), 0.1 g isopropylamine, and 0.11 g bis(diisopropylamino)dimethylsilane to a 1-liter reactor. Resin to polymer ratio was 2.6. The mixture was reflux dried for 1 hour then cooled. The excess base was neutralized with phosphoric acid to 0-10 ppm as acid. The adhesive composition viscosity was 640 cps. It contained 74.9% solid at 25° C. and 136 ppm hydride on a 100% solids basis. The SiH/Vi ratio was 1.0. A 25.0 g sample was removed and 25 ppm platinum on solids basis was added then bar coated onto 45-micron polyester film at 125 microns as dry film thickness (dft). Cure was for 5 minutes at 135° C. Pressure sensitive adhesive properties were: >4,000 g/in peel adhesion (limit of test instrument), Polyken Probe Tack, 100 g/cm², 1-second dwell was <50 g/cm².

Example 2

Example 2 illustrates the process to prepare addition cureable PSA from in-situ functionalized MQ resin.

To a 1-liter reactor was charged 150.0 g $M^{Vi}D^{Vi}_3D_{6600}M^{Vi}$ (100 wt % of polyoragnosiloxane polymer), 325 g of a 10.4 cstks. 60% toluene solution MQ resin, M/Q=0.7 and 2.70 wt % OH (0.3097 moles OH), and 150.0 g toluene. Resin to polymer ratio was 1.30. The mixture was reflux dried then 10.0 g of a 20-wt % toluene solution of 1,1,3,3-tetramethyldisilazane was slowly added and agitated for 2 hours at room temperature. After agitation for an additional 1 hour at room temperature, the mixture was refluxed for one hour, excess base neutralized with phosphoric acid to 0-10 ppm as acid, then excess toluene was removed, then resulting composition was cooled to room temperature. The adhesive composition viscosity was 408,000 cps, 70.8% solid at 25° C., and 23 ppm hydride on a 100% solids basis by a gasometrical method determined. Using the above calculation method the silanol-silicon hydride resin had 0.3058 moles OH (98.6 mole %) and 0.0045 moles H (1.4 mole % H) prior to refluxing. The SiH/Vi ratio was 4.9.

A 25.0 g sample was removed and 55 ppm platinum on solids basis using a 1000 ppm as platinum Ashby catalyst in toluene solution was added, then bar coated onto 25 micron polyimide film at 42 microns as dry film thickness (dft). Pressure sensitive adhesive properties were: 824 g/in peel adhesion, and Shear Adhesion Failure Temperature (SAFT), 1 inch×1 inch overlap, 1 Kg weight was 345° C. This coated film was re-tested after one month and peel adhesion was 908 g/in.

Comparison Example 1

Example 2 was repeated except 1.0 g of ammonium hydroxide instead of 1,1,3,3-tetramethyldisilazane was added. The prepared composition did not cure, failing cohesively when tested. When 2 wt % benzoyl peroxide was added on a solids basis, then the composition did cure to yield 302° C. SAFT.

Examples 3 to 11 illustrate addition curable PSAs prepared from in-situ functionalized MQ resins and various vinyl-functional polydiorganosiloxanes.

Example 3

To a 1-liter reactor was charged 100.0 g $M^{Vi}D^{Vi}_8D_{4100}M^{Vi}$ (100 wt % of polyoragnosiloxane polymer), 220.0 g of a 10.4 cstks. 60% toluene solution MQ resin, M/Q=0.7 and 2.00 wt % OH (0.1553 moles OH), and 100.0 g toluene. Resin to polymer ratio was 1.32. The mixture was reflux dried, then 13.0 g of a 20 wt % toluene solution of 1,1,3,3-tetramethyldisilazane was slowly added and agitated for 2 hours at room temperature. After agitation for an additional 1 hour at room temperature, the mixture was refluxed for one hour. Excess base was neutralized with phosphoric acid to 0-10 ppm as acid, then excess toluene was removed, then the resulting composition was cooled to room temperature. The adhesive composition viscosity was 80,400 cps, 72.2% solid at 25° C., 39 ppm hydride on a 100% solids basis. Using the above calculation method the silanol-silicon hydride resin had 0.1501 moles OH (96.7 mole %) and 0.0051 moles H (3.3 mole % H) prior to refluxing. The SiH/Vi ratio was 4.9.

A 25.0 g sample was removed and 25 ppm platinum on solids basis was added, then bar coated onto 25 micron polyimide film at 42 microns as dry film thickness (dft). Pressure sensitive adhesive properties were: 570 g/in peel adhesion Example 4

To a 1-liter reactor was charged 100.0 g $M^{Vi}D^{Vi}_2D_{3200}M^{Vi}$ (100 wt % of polyoragnosiloxane polymer), 220.0 g of a 10.4 cstks. 60% toluene solution MQ resin, M/Q=0.7 and 2.00 wt % OH (0.1533 moles OH), and 100.0 g toluene. Resin to polymer ratio was 1.32. The mixture was reflux dried, then 13.0 g of a 20 wt % toluene solution of 1,1,3,3-tetramethyldisilazane was slowly added and agitated for 2 hours at room temperature. After agitation for an additional 1 hour at room temperature, the mixture was refluxed for one hour. Excess base was neutralized with phosphoric acid to 0-10 ppm as acid, then excess toluene was removed, then resulting composition was cooled to room temperature. The adhesive composition viscosity was 83,600 cps, 72.5% solid at 25° C., 37 ppm hydride on a 100% solids basis. Using the above calculation method the silanol-silicon hydride resin had 0.1504 moles OH (96.9 mole %) and 0.0049 moles H (3.1 mole % H) prior to refluxing. The SiH/Vi ratio was 5.1.

A 25.0 g sample was removed and 25 ppm platinum on solids basis was added, then bar coated onto 25 micron polyimide film at 42 microns as dry film thickness (dft). Pressure sensitive adhesive properties were: 758 g/in peel adhesion. This coated film was re-tested after one month and peel adhesion was 826 g/in.

Example 5

To a 1-liter reactor was added 100.0 g of $MD^{Vi}_{13}D_{6750}M$ (100 wt % of polyorganosiloxane polymer), 220.0 g of a 10.0 cstks. 60% toluene solution MQ resin, M/Q=0.7 and 2.70 wt % OH (0.2096 moles OH). The resin to polymer ratio was 1.32. The mixture was reflux dried, then 3.0 g of 1,1,3,3-tetramethyldisilazane was slowly added along with 0.18 g of bis-(diisopropylamino)dimethylsilane. The mixture was agitated for 2 hours at room temperature, then refluxed for one hour. Excess base was neutralized with phosphoric acid to 0-10 ppm as acid, then excess toluene was removed, then resulting composition was cooled to room temperature. The adhesive composition viscosity was 73,500 cps, 57.2% solid at 25° C., 63 ppm hydride on a 100% solids basis. Using the above calculation method the silanol-silicon hydride resin had 0.2013 moles OH (96.0 mole %) and 0.0083 moles H (4.0 mole % H) prior to refluxing. The SiH/Vi ratio was 3.6.

A 25.0 g sample was removed and 25 ppm platinum on solids basis was added, then bar coated onto 45 micron polyester film at 162 microns as dry film thickness (dft) and cured at 135° C. for 5 minutes. Peel adhesion was 583 g/in.

Example 6

To a 1-liter reactor was added 100.0 g of $M^{Vi}D^{Vi}_2D_{4200}D^{Phenyl}_{250}M^{Vi}$ (100 wt % of polyorganosiloxane polymer), 220.0 g of a 10.4 cstks. 60% toluene solution MQ resin, M/Q=0.7 and 2.70 wt % OH (0.2096 moles OH), and 100.0 g toluene. Resin to polymer ratio was 1.32. The mixture was reflux dried, then 13.0 g of a 20 wt % toluene solution of 1,1,3,3-tetramethyldisilazane was slowly added along with 0.18 g of bis-(diisopropylamino)dimethylsilane. The mixture was agitated for 2 hours at room temperature, then refluxed for one hour. Excess base was neutralized with phosphoric acid to 0-10 ppm as acid, then excess toluene was removed, then resulting composition was cooled to room temperature. The adhesive composition viscosity was 31,700 cps, 59.8% solid at 25° C., 73 ppm hydride on a 100% solids basis. Using the above calculation method the silanol-silicon hydride resin had 0.2000 moles OH (95.4 mole %) and 0.0091 moles H (4.6 mole % H) prior to refluxing. The SiH/Vi ratio was 18.6.

A 25.0 g sample was removed and 15 ppm platinum on solids basis was added, then bar coated onto 25 micron polyimide film at 45 microns as dry film thickness (dft). Pressure sensitive adhesive properties were: 936 g/in peel adhesion.

Example 7

To a 1-liter reactor was added 100.0 g of $M^{Vi}D^{Vi}_3D_{6500}D^{Phenyl}_{380}M^{Vi}$ (100 wt % of polyorganosiloxane polymer), 220.0 g of a 10.4 cstks. 60% toluene solution MQ resin, M/Q=0.7 and 2.700 wt % OH (0.2096 moles OH), and 100.0 g toluene. Resin to polymer ratio was 1.32. The mixture was reflux dried, then 13.0 g of a 20 wt % toluene solution of 1,1,3,3-tetramethyldisilazane was slowly added along with and 0.18 g of bis-(diisopropylamino)dimethylsilane. The mixture was agitated for 2 hours at room temperature, then refluxed for one hour. Excess base was neutralized with phosphoric acid to 0-10 ppm as acid, then excess toluene was removed, then resulting composition was cooled to room temperature. The adhesive composition viscosity was 84,800 cps, 71.1% solid at 25° C., 91 ppm hydride on a 100% solids basis. Using the above calculation method the silanol-silicon hydride resin had 0.1976 moles OH (94.3 mole %) and 0.0091 moles H (5.7 mole % H) prior to refluxing. The SiH/Vi ratio was 23.0.

A 25.0 g sample was removed and 80 ppm platinum on solids basis was added, then bar coated onto 25 micron polyimide film at 45 microns as dry film thickness (dft). Pressure sensitive adhesive properties were: 923 g/in peel adhesion.

Example 8

To a 1-liter reactor was charged 100.0 g $M^{Vi}D_{800}M^{Vi}$ (100 wt % of the polyoranosiloxane polymer), 286.0 g of a 10.4 cstks. 60% toluene solution MQ resin, M/Q=0.7 and 2.70 wt % OH (0.2725 moles OH). Resin to polymer ratio was 1.72. The mixture was reflux dried, then 16.9 g of a 20 wt % toluene solution of 1,1,3,3-tetramethyldisilazane was slowly added and agitated for 2 hours at room temperature. The mixture was refluxed for one hour. Excess base was neutralized with phosphoric acid to 0-10 ppm as acid, then excess toluene was removed, then the resulting composition was cooled to room temperature. The adhesive composition viscosity was 3,120 cps, 82.4% solid at 25° C., 149 ppm hydride on a 100% solids basis. Using the above calculation method the silanol-silicon hydride resin had 0.2470 moles OH (90.6 mole %) and 0.0256 moles H (9.4 mole % H) prior to refluxing. The SiH/Vi ratio was 18.0.

A 25.0 g sample was removed and 80 ppm platinum on solids basis was added, then bar coated onto 25-micron polyimide film at 45 microns as dry film thickness (dft). Pressure sensitive adhesive properties were: cohesive failure for peel adhesion, and Shear Adhesion Failure Temperature (SAFT), 1 inch×1 inch overlap, 1 Kg weight cohesive failure at 25° C.

Example 9

To a 1-liter reactor was charged 100.0 g $M^{Vi}D^{Vi}{}_7D_{3200}M^{Vi}$ (100 wt % of polyorganosiloxane polymer), 220.0 g of a 10.4 cstks. 60% toluene solution MQ resin, M/Q=0.7 and 2.70 wt % OH (0.2096 moles OH), and 100.0 g toluene. Resin to polymer ratio was 1.32. The mixture was reflux dried, then 6.5 g of a 20 wt % toluene solution of 1,1,3,3-tetramethyldisilazane was slowly added and agitated for 2 hours at room temperature. The mixture was refluxed for one hour. Excess base was neutralized with phosphoric acid to 0-10 ppm as acid, then excess toluene was removed, then the resulting composition cooled to room temperature. The adhesive composition viscosity was 62,000 cps, 77.9% solid at 25° C., 46 ppm hydride on a 100% solids basis. Using the above calculation method the silanol-silicon hydride resin had 0.1990 moles OH (94.9 mole %) and 0.0107 moles H (5.1 mole % H) prior to refluxing. The SiH/Vi ratio was 3.2.

A 25.0 g sample was removed and 81 ppm platinum on solids basis was added, then bar coated onto 25 micron polyimide film at 45 microns as dry film thickness (dft). Pressure sensitive adhesive properties were: 596 g/in peel adhesion, and Shear Adhesion Failure Temperature (SAFT), 1 inch×1 inch overlap, 1 Kg weight was 343° C.

Example 10

Example 3 was repeated except 18.0 g of the 20 wt % toluene solution of 1,1,3,3-tetramethyldisilazane was added. The adhesive composition viscosity was 58,000 cps, 77.2% solid at 25° C., 101 ppm hydride on a 100% solids basis. Using the above calculation method the silanol-silicon hydride resin had 0.1420 moles OH (91.4 mole %) and 0.0133 moles H (8.6 mole % H) prior to refluxing. The SiH/Vi ratio was 7.0.

A 25.0 g sample was removed and 83 ppm platinum on solids basis was added, then bar coated onto 25 micron polyimide film at 45 microns as dry film thickness (dft). Pressure sensitive adhesive properties were: 539 g/in peel adhesion, and Shear Adhesion Failure Temperature (SAFT), 1 inch×1 inch overlap, 1 Kg weight was 343° C.

Example 11

Example 3 was repeated except 26.0 g of the 20 wt % toluene solution of 1,1,3,3-tetramethyldisilazane was added. The adhesive composition viscosity was 45,600 cps, 77.0% solid at 25° C., 259 ppm hydride on a 100% solids basis. Using the above calculation method the silanol-silicon hydride resin had 0.1211 moles OH (78.0 mole %) and 0.0342 moles H (22.0 mole % H) prior to refluxing. The SiH/Vi ratio was 18.0.

A 25.0 g sample was removed and 80 ppm platinum on solids basis was added, then bar coated onto 25 micron polyimide film at 45 microns as dry film thickness (dft). Pressure sensitive adhesive properties were: 515 g/in peel adhesion, and Shear Adhesion Failure Temperature (SAFT), 1 inch×1 inch overlap, 1 Kg weight was 343° C.

Examples 12 to 22 illustrate addition curable PSAs prepared from in-situ functionalized MQ resins and blends of vinyl-functional polyorganosiloxane.

Example 12

To a 1-liter reactor was charged 130.0 g a blend of vinyl-functional polydiorganosiloxanes as noted in Table 1 below, 286.0 g of a 10.4 cstks. 60% toluene solution MQ resin, M/Q=0.7, and 2.70 wt % OH (0.2725 moles OH). Resin to polymer ratio was 1.32. The mixture was reflux dried, then 16.0 g of a 20 wt % toluene solution of 1,1,3,3-tetramethyldisilazane was slowly added along with 0.15 g bis(diisopropylamino)dimethylsilane. The mixture was agitated for 1 hour at room temperature, then refluxed for one hour. Excess base was neutralized with phosphoric acid to 0-10 ppm as acid, then excess toluene was removed, then the resulting composition was cooled to room temperature. Adhesive viscosity, % solid at 25° C., ppm hydride on a 100% solids basis and SiH/Vi are detailed in Table 1. Using the above calculation method the silanol-silicon hydride resin in respective order were 0.2641 moles OH (96.9 mole %) and 0.0084 moles H (3.1 mole % H); 0.2598 moles OH (95.3 mole %) and 0.0127 moles H (4.7 mole % H); 0.2532 moles OH (92.9 mole %) and 0.0194 moles H (7.1 mole % H) prior to refluxing.

A 25.0 g sample of each was removed and 80 ppm platinum on solids basis was added, then bar coated onto 25 micron polyimide film at 45 microns as dry film thickness (dft). Peel adhesion results are listed in Table 1. Cured adhesive was collected and residual silicon hydride determined to be non-detectable for these PSAs.

TABLE 1

Mixture of Vinyl-Functional Polydiorganosiloxane Derived PSAs

| $M^{Vi}D_{800}M^{Vi}/$ $M^{Vi}D^{Vi}{}_7D_{3200}M^{Vi}$ weight ratio | Viscosity, cps | Wt % Solids | ppm Hydride | Peel Adhesion, g/in |
|---|---|---|---|---|
| 75/25 | 2,000 | 74.1 | 49 | 1163 |
| 50/50 | 4,800 | 72.4 | 74 | 1017 |
| 25/75 | 15,400 | 74.1 | 113 | 999 |

Example 13

This example illustrates end-capping residual silanol groups after pressure sensitive adhesive preparation making compositions suitable for applications where residual silanol groups negatively interact with additives such as pharmaceutical drugs/vitamins.

To a 1-liter reactor was added 65.0 g of $M^{Vi}D^{Vi}{}_7D_{3200}M^{Vi}$ (50 wt % of polyorganosiloxane polymer), 65.0 g of $M^{Vi}D_{800}M^{Vi}$ (50 wt % of polyorganosiloxane polymer), 286.0 g of a 10.4 cstks. 60% toluene solution MQ resin, M/Q=0.7 and 2.70 wt % OH (0.2725 moles OH), and 100.0 g toluene. The resin to polymer ratio was 1.32. The mixture was reflux dried, then 3.2 g of 1,1,3,3-tetramethyldisilazane and 0.15 g of bis(diisopropylamino)dimethylsilane were slowly added then agitated for 2 hours at room temperature. Using the above calculation method the silanol-silicon hydride resin had 0.2559 moles OH (93.9 mole %) and 0.0166 moles H (6.1 mole % H) prior to the next addition and refluxing. The mixture was refluxed for 1 hour then cooled below 90° C. Then 7.0 g hexamethyldisilazane was added, then the mixture was returned to reflux for 1 hour. Excess base was neutralized with phosphoric acid to 0-10 ppm as acid, then excess toluene was removed, then the resulting composition was cooled to room temperature. The adhesive composition viscosity was 30,300 cps and 84.3% solid at 25° C., 97 ppm hydride on a 100% solids basis. The SiH/Vi ratio was 6.4.

A 25.0 g sample was removed and 25 ppm platinum on solids basis was added, then bar coated onto 25-micron polyimide film at 97 microns as dry film thickness (dft) and cured at 135° C. for 5 minutes. Peel adhesion was: 1767 g/in.

Example 14

To a 3-liter reactor was added 165.0 g of $M^{Vi}D^{Vi}{}_7D_{3200}M^{Vi}$ (40 wt % of polyorganosiloxane polymer), 165.0 g of $M^{Vi}D_{800}M^{Vi}$ (40 wt % of polyorganosiloxane polymer) 83.0 g of $M^{Vi}{}_3D_{95}T_{2.5}$ (20 wt % of polyorganosiloxane polymer), 827.0 g of a 10.4 cstks. 60% toluene solution MQ resin, M/Q=0.7 and 2.70 wt % OH (0.7876 moles OH), and 250.0 g toluene. Resin to polymer ratio was 1.20. The mixture was reflux dried, then 50.8 g of a 20 wt % toluene solution of 1,1,3,3-tetramethyldisilazane was slowly added along with 0.65 g bis(diisopropylamino)dimethylsilane. The mixture was agitated for 2 hours at room temperature, then refluxed for one hour. Excess base was neutralized with phosphoric acid to 0-10 ppm as acid, then excess toluene was removed, then the resulting composition was cooled to room temperature. The adhesive composition viscosity was 17,800 cps, 85.0% solid at 25° C., 63 ppm hydride on a 100% solids basis. Using the above calculation method the silanol-silicon hydride resin had 0.7564 moles OH (96.0 mole %) and 0.0312 moles H (4.0 mole % H) prior to refluxing. The SiH/Vi ratio was 1.4.

A 25.0 g sample was removed and 25 ppm platinum on solids basis was added, then bar coated onto 25 micron polyimide film at 45 microns as dry film thickness (dft) and cured at 105° C. for 5 minutes. Peel adhesion was: 837 g/in peel adhesion.

Example 15

To a 1-liter reactor was added 33.5 g of $M^{Vi}D^{Vi}{}_7D_{3200}M^{Vi}$ (20 wt % of polyorganosiloxane polymer), 100.3 g of $M^{Vi}D_{800}M^{Vi}$ (60 wt % of polyorganosiloxane polymer), 33.5 g of $M^{Vi}{}_3D_{95}T_{2.5}$, (20 wt % of polyorganosiloxane polymer), 476.8 g of a 6.6 cstks. 60% toluene solution MQ resin, M/Q=1.1 and 2.50 wt % OH (0.4207 moles OH). The resin to polymer ratio was 1.71. The mixture was reflux dried, then 5.7 g of 1,1,3,3-tetramethyldisilazane was slowly added along with 0.25 g of bis(diisopropylamino)dimethylsilane. The mixture was agitated for 2 hours at room temperature, then refluxed for one hour. Excess base was neutralized with phosphoric acid to 0-10 ppm as acid, then excess toluene was removed, then the resulting composition was cooled to room temperature. The adhesive composition viscosity was 25,000 cps, 90.5% solid at 25° C., 112 ppm hydride on a 100% solids basis. Using the above calculation method the silanol-silicon hydride resin had 0.3887 moles OH (92.4 mole %) and 0.0320 moles H (7.6 mole % H) prior to refluxing. The SiH/Vi ratio was 3.0.

A 25.0 g sample was removed and 25 ppm platinum on solids basis was added, then bar coated onto 25 micron polyimide film at 95 microns as dry film thickness (dft) and cured at 135° C. for 5 minutes. Peel adhesion: 3831 g/in., Polyken Probe tack, 100 g/cm$^2$, 1 second dwell: 1539 g/cm$^2$.

Example 16

To a 1-liter reactor was added 13.0 g of $M^{Vi}D^{Vi}{}_7D_{3200}M^{Vi}$ (10 wt % of polyorganosiloxane polymer), 117.0 g of $M^{Vi}D_{800}M^{Vi}$ (90 wt % of polyorganosiloxane polymer), 238.0 g of a 10.4 cstks. 60% toluene solution MQ resin, M/Q=0.7 and 2.70 wt % OH (0.2270 moles OH), and 100.0 g toluene. Resin to polymer ratio was 1.10. The mixture was reflux dried then 3.2 g of 1,1,3,3-tetramethyldisilazane was slowly added along with 0.15 g of bis(diisopropylamino)dimethylsilane. The mixture was agitated for 2 hours at room temperature, then refluxed for one hour. Excess base was neutralized with phosphoric acid to 0-10 ppm as acid, then excess was toluene removed, then the resulting composition was cooled to room temperature. The adhesive composition viscosity was 16,700 cps, 91.0% solid at 25° C., 75 ppm hydride on a 100% solids basis. Using the above calculation method the silanol-silicon hydride resin had 0.2162 moles OH (95.3 mole %) and 0.0107 moles H (4.7 mole % H) prior to refluxing. The SiH/Vi ratio was 4.6.

A 25.0 g sample was removed and 25 ppm platinum on solids basis was added, then bar coated onto 25 micron polyimide film at 92 microns as dry film thickness (dft) and cured at 135° C. for 5 minutes. Peel adhesion was: 1243 g/in.

Example 17

To a 1-liter reactor was added 13.0 g of $M^{Vi}D^{Vi}{}_7D_{3200}M^{Vi}$ (8.3 wt % of polyorganosiloxane polymer), 117.0 g of $M^{Vi}D_{800}M^{Vi}$ (74.5 wt % of polyorganosiloxane polymer), 27.0 g of $M^{Vi}{}_3D_{95}T_{2.5}$ (17.2 wt % of polyorganosiloxane polymer), 288.0 g of a 10.4 cstks. 60% toluene solution MQ resin, M/Q=0.7 and 2.70 wt % OH (0.2744 moles OH), and 100.0 g toluene. Resin to polymer ratio was 1.10. The mixture was reflux dried, then 4.8 g of 1,1,3,3-tetramethyldisilazane was slowly added along with 0.15 g of bis(diisopropylamino)dimethylsilane. The mixture was agitated for 2 hours at room temperature, then refluxed for one hour. Excess base was neutralized with phosphoric acid to 0-10 ppm as acid, then excess toluene was removed, then the resulting composition was cooled to room temperature. The adhesive composition viscosity was 29,000 cps, 95.1% solid at 25° C., 77 ppm hydride on a 100% solids basis. Using the above calculation method the silanol-silicon hydride resin had 0.2611 moles OH (95.2 mole %) and 0.0133 moles H (4.8 mole % H) prior to refluxing. The SiH/Vi ratio was 1.8.

A 25.0 g sample was removed and 25 ppm platinum on solids basis was added, then bar coated onto 25 micron polyimide film at 97 microns as dry film thickness (dft) and cured at 135° C. for 5 minutes. Peel adhesion was: 642 g/in.

Example 18

To a 1-liter reactor was added 13.0 g of $M^{Vi}D^H{}_7D_{3200}M^{Vi}$ (7.1 wt % of polyorganosiloxane polymer), 117.0 g of $M^{Vi}D_{800}M^{Vi}$ (63.6 wt % of polyorganosiloxane polymer), 54.0 g of $M^{Vi}{}_3D_{95}T_{2.5}$ (29.3 wt % of polyorganosiloxane polymer), 288.0 g of a 10.4 cstks. 60% toluene solution MQ resin, M/Q=0.7 and 2.70 wt % OH (0.2744 moles OH), and 100.0 g toluene. Resin to polymer ratio was 0.94. The mixture was reflux dried, then 3.2 g of 1,1,3,3-tetramethyldisilazane was slowly added along with 0.15 g of bis(diisopropylamino) dimethylsilane. The mixture was agitated for 2 hours at room temperature, then refluxed for one hour. Excess base was neutralized with phosphoric acid to 0-10 ppm as acid, then excess toluene was removed, then the resulting composition was cooled to room temperature. The adhesive composition viscosity was 8,400 cps, 91.6% solid at 25° C., 70 ppm hydride on a 100% solids basis. Using the above calculation method the silanol-silicon hydride resin had 0.2623 moles OH (95.6 mole %) and 0.0121 moles H (4.4 mole % H) prior to refluxing. The SiH/Vi ratio was 1.1.

A 25.0 g sample was removed and 25 ppm platinum on solids basis was added, then bar coated onto 25 micron polyimide film at 95 microns as dry film thickness (dft) and cured at 135° C. for 5 minutes. Peel adhesion was: 524 g/in.

Example 19

To a 1-liter reactor was added 12.0 g of $M^{Vi}D^H{}_7D_{3200}M^{Vi}$ (8.4 wt % of polyorganosiloxane polymer), 107.0 g of $M^{Vi}D_{800}M^{Vi}$ (74.6 wt % of polyorganosiloxane polymer), 24.3 g of $M^{Vi}{}_3D_{95}T_{2.5}$ (17.0 wt % of polyorganosiloxane polymer), 432.0 g of a 10.4 cstks. 60% toluene solution MQ resin, M/Q=0.7 and 2.70 wt % OH (0.4118 moles OH). The resin to polymer ratio was 1.81. The mixture was reflux dried then 4.8 g of 1,1,3,3-tetramethyldisilazane was slowly added along with 0.15 g of bis(diisopropylamino)dimethylsilane. The mixture was agitated for 2 hours at room temperature, then refluxed for one hour. Excess base was neutralized with phosphoric acid to 0-10 ppm as acid, then excess toluene was removed, then the resulting composition was cooled to room temperature. The adhesive composition viscosity was 6,920 cps, 87.9% solid at 25° C., 134 ppm hydride on a 100% solids basis. Using the above calculation method the silanol-silicon hydride resin had 0.3770 moles OH (91.6 mole %) and 0.0347 moles H (8.4 mole % H) prior to refluxing. The SiH/Vi ratio was 4.1.

A 25.0 g sample was removed and 25 ppm platinum on solids basis was added, then bar coated onto 50 micron polyester film at 95 microns as dry film thickness (dft) and cured at 135° C. for 5 minutes. Peel adhesion was: 3042 g/in.

Comparison Example 2

Example 19 was repeated without the higher molecular weight $M^{Vi}D^H{}_7D_{3200}M^{Vi}$. The adhesive composition viscosity was 2,560 cps, 84.2% solid at 25° C., 122 ppm hydride on a 100% solids basis. Using the above calculation method the silanol-silicon hydride resin had 0.4118 moles OH (92.3 mole %) and 0.0316 moles H (7.7 mole % H) prior to refluxing. The SiH/Vi ratio was 3.8.

A 25.0 g sample was removed and 25 ppm platinum on solids basis was added, then bar coated onto 50 micron polyester film at 89 microns as dry film thickness (dft) and cured at 135° C. for 5 minutes. Peel adhesion was: 3061 g/in with cohesive failure.

Example 20

To a 3-liter reactor was added 115.0 g of $M^{Vi}D^H{}_7D_{3200}M^{Vi}$ (28.0 wt % of polyorganosiloxane polymer), 213.0 g of $M^{Vi}D_{800}M^{Vi}$ (52.0 wt % of polyorganosiloxane polymer), 82.0 g of $M^{Vi}{}_3D_{95}T_{2.5}$ (20.0 wt % of polyorganosiloxane polymer), 1117.0 g of a 10.4 cstks. 60% toluene solution viscosity MQ resin, M/Q=0.7 and 2.70 wt % OH (1.0644 moles OH), 250.0 g of a 6.6 cstks. 60% toluene solution MQ resin, M/Q=1.1 and 2.50 wt % OH (0.2206 moles OH). The resin mixture moles of OH were 1.2850. The resin to polymer ratio was 2.0. The mixture was reflux dried, then 14.0 g of 1,1,3,3-tetramethyldisilazane was slowly added along with 0.40 g of bis(diisopropylamino)dimethylsilane. The mixture was agitated for 2 hours at room temperature, then refluxed for one hour. Excess base neutralized with phosphoric acid to 0-10 ppm as acid, then excess toluene was removed, then the resulting composition was cooled to room temperature. The adhesive composition viscosity was 6,400 cps, 87.4% solid at 25° C., 137 ppm hydride on a 100% solids basis. Using the above calculation method the silanol-silicon hydride resin had 1.1902 moles OH (91.4 mole %) and 0.1124 moles H (8.6 mole % H) prior to refluxing. The SiH/Vi ratio was 4.1.

A 25.0 g sample was removed and 25 ppm platinum on solids basis was added, then bar coated onto 50 micron polyester film at 101 microns as dry film thickness (dft) and cured at 135° C. for 5 minutes. Peel adhesion was: 7600 g/in., Polyken Probe tack, 100 g/cm², 1 second dwell: 90 g/cm².

Example 21

To a 3-liter reactor was added 129.0 g of $M^{Vi}D^H{}_7D_{3200}M^{Vi}$ (28.8 wt % of polyorganosiloxane polymer), 240.0 g of $M^{Vi}D_{800}M^{Vi}$ (52.0 wt % of polyorganosiloxane polymer), 92.0 g of $M^{Vi}{}_3D_{95}T_{2.5}$ (20.0 wt % of polyorganosiloxane polymer), 1117.0 g of a 10.4 cstks. 60% toluene solution MQ resin, M/Q=0.7 and 2.70 wt % OH (1.0644 moles OH), 250.0 g of a 6.6 cstks. 60% toluene solution MQ resin, M/Q=1.1 and 2.50 wt % OH (0.2206 moles OH). The resin mixture moles of OH were 1.2850. The resin to polymer ratio was 1.78. The mixture was reflux dried, then 14.0 g of 1,1,3,3-tetramethyldisilazane was slowly added along with 0.40 g of bis(diisopropylamino)dimethylsilane. The mixture was agitated for 2 hours at room temperature, then refluxed for one hour. Excess base neutralized with phosphoric acid to 0-10 ppm as acid, then excess toluene was removed, then the resulting composition was cooled to room temperature. The adhesive composition viscosity was 6,400 cps, 87.4% solid at 25° C., 137 ppm hydride on a 100% solids basis. Using the above calculation method the silanol-silicon hydride resin had 1.1720 moles OH (91.3 mole %) and 0.1124 moles H (8.7 mole % H) prior to refluxing. The SiH/Vi ratio was 4.1.

A 25.0 g sample was removed and 25 ppm platinum on solids basis was added, then bar coated onto 50 micron polyester film at 101 microns as dry film thickness (dft) and cured at 135° C. for 5 minutes. Peel adhesion was: 1930 g/in., Polyken Probe tack, 100 g/cm², 1 second dwell: 593 g/cm².

Example 22

To a 1-liter reactor was added 75.0 g of $M^{Vi}D^H{}_7D_{3200}M^{Vi}$ (70.0 wt % of polyorganosiloxane polymer), 32.2 g of $M^{Vi}{}_3D_{95}T_{2.5}$ (30.0 wt % of polyorganosiloxane polymer), 257.0 g of a 10.4 cstks. 60% toluene solution MQ resin, M/Q=0.7 and 2.70 wt % OH (0.2449 moles OH), 135.5 g of a 6.6 cstks. 60% toluene solution MQ resin, M/Q=1.1 and 2.50 wt % OH (0.1196 moles OH). The resin mixture moles of OH were 0.3645. The resin to polymer ratio was 2.0. The mixture was reflux dried, then 4.7 g of 1,1,3,3-tetramethyldisilazane was slowly added along with 0.14 g of bis(diisopropylamino)dimethylsilane. The mixture was agitated for 2 hours at room temperature, then refluxed for one hour. Excess base was neutralized with phosphoric acid to 0-10 ppm as acid, then excess toluene was removed, then the resulting composition was cooled to room temperature. The adhesive composition viscosity was 275,000 cps, 95.7% solid at 25° C., 88 ppm hydride on a 100% solids basis. Using the above calculation method the silanol-silicon hydride resin had 0.3438 moles OH (94.3 mole %) and 0.0207 moles H (5.7 mole % H) prior to refluxing. The SiH/Vi ratio was 2.2.

A 25.0 g sample was removed and 25 ppm platinum on solids basis was added, then bar coated onto 50 micron polyester film at 75 microns as dry film thickness (dft) and cured at 135° C. for 5 minutes. Peel adhesion was: 4000 g/in, Polyken Probe tack, 100 g/cm$^2$, 1 second dwell: 50 g/cm$^2$.

Example 23

This example illustrates post addition of vinyl-functional polydiorganosiloxane to PSA compositions.

Part A: To a 3-liter reactor was added 220.0 g of $M^{Vi}D^{Vi}_7D_{3200}M^{Vi}$ (50 wt % of polyorganosiloxane polymer), 220.0 g of $M^{Vi}D_{800}M^{Vi}$ (50 wt % of polyorganosiloxane polymer), 815.0 g of a 10.4 cstks. 60% toluene solution MQ resin, M/Q=0.7 and 2.70 wt % OH (0.7762 moles OH), and 250.0 g toluene. Resin to polymer ratio was 1.11. The mixture was reflux dried, then 11.0 g of 1,1,3,3-tetramethyldisilazane was slowly added along with 0.65 g of bis(diisopropylamino)dimethylsilane. The mixture was agitated for 2 hours at room temperature, then refluxed for one hour. Excess base was neutralized with phosphoric acid to 0-10 ppm as acid, then excess toluene was removed, then the resulting composition was cooled to room temperature. The adhesive composition viscosity was 24,100 cps, 90.0% solid at 25° C., 117 ppm hydride on a 100% solids basis. Using the above calculation method the silanol-silicon hydride resin had 0.7190 moles OH (92.6 mole %) and 0.0572 moles H (7.4 mole % H) prior to refluxing. The SiH/Vi ratio was 6.9.

Part B: Samples were prepared with weight percent of $M^{Vi}_3D_{95}T_{2.5}$ added to above part A PSA as given in Table 2 below. To these 25 ppm platinum on solids basis was added, then bar coated onto 50 micron polyester film at 200 microns as dry film thickness (dft) and cured at 135° C. for 5 minutes.

TABLE 2

Post Addition of vinyl-polyorganosiloxane to addition cure PSA compositions

| Wt % $M^{Vi}_3D_{95}T_{2.5}$ | SiH/Vi | Peel Adhesion, g/in, glass |
|---|---|---|
| 0 | 6.9 | 959 |
| 5 | 3.4 | 645 |
| 10 | 2.2 | 332 |

Examples 24 to 31 illustrate compositions of the invention can be formulated with unsaturated olefins and or silicone hydride(s) and or additional MQ resin.

Example 24

Part A: To a 3-liter reactor was added 170.0 g of $M^{Vi}D^{Vi}_7D_{3200}M$ (40 wt % of polyorganosiloxane polymer), 170.0 g of $M^{Vi}D_{800}M^{Vi}$ (40 wt % of polyorganosiloxane polymer) 85.0 g of $M^{Vi}_3D_{95}T_{2.5}$ (20 wt % of polyorganosiloxane polymer), 810.0 g of a 10.4 cstks. 60% toluene solution MQ resin, M/Q=0.7 with 2.70 wt % OH (0.7719 moles OH), and 540.0 g of a 6.6 cstks. 60% toluene solution MQ resin, M/Q=1.1 and 2.50 wt % OH (0.4765 moles OH). The resin mixture moles OH were 1.2484. Resin to polymer ratio was 1.90. The mixture was reflux dried, then 17.0 g of 1,1,3,3-tetramethyldisilazane was slowly added followed by 0.40 g of bis(diisopropylamino)dimethylsilane. The mixture was agitated at room temperature, then refluxed for one hour. Excess base neutralized with phosphoric acid to 0-10 ppm as acid, then excess toluene was removed, then the composition was cooled to room temperature. The adhesive composition viscosity was 1,158 cps, 73.9% solid at 25° C., 149 ppm hydride on a 100% solids basis. Using the above calculation method the silanol-silicon hydride resin had 1.1278 moles OH (90.3 mole %) and 0.01206 moles H (9.7 mole % H) prior to refluxing. The SiH/Vi ratio was 4.2.

A 25.0 g sample was removed and 45 ppm platinum on solids basis added from a 1800 ppm Ashby solution in toluene, then bar coated onto 25 micron polyimide film at 45 microns as dry film thickness (dft) and cured at 105° C. for 5 minutes. Peel adhesion was: 2327 g/in peel adhesion, Polyken Probe tack, 100 g/cm$^2$, 1 second contact time was 87 g/cm$^2$.

Part B: The adhesive composition from part A of Example 24 was further formulated as shown in Table 3 below. This illustrates modification of adhesive compositions of the invention by addition of reactive diluent such as the alpha-olefin with polydimethylmethylhydrogensiloxanes and siloxane resin to alter adhesive properties.

TABLE 3

Adhesive Formulations

|  | A | B | C |
|---|---|---|---|
| Adheisve from part A of Example 24 | 50.0 g | 40.0 g | 40.0 g |
| C12-C18 Alpha-Olefin | 1.5 g | 1.5 g | 1.5 g |
| $MD_{17}D^H_4M$ | 1.4 g | 1.1 g | 1.1 g |
| $M^H D_{25} M^H$ | 0.4 g | 0.3 g | 0.3 g |
| 60% M/Q resin in toluene, 2.5 wt % OH |  | 11.9 g | 15.3 g |
| Resin/Polymer Ratio | 1.9 | 2.6 | 2.8 |
| Peel Adhesion, g/in | 782 | 2225 | 2121 |
| Tack, g/cm$^2$ | 1107 | 1297 | 1058 |

Example 25

This example illustrates that additional reactive diluents as shown in Table 4 below can be formulated with addition cure PSA of the invention.

Part A: To a 3-liter reactor was added 340.0 g of $M^{Vi}D^{Vi}_7D_{3200}M^{Vi}$ (80 wt % of polyorganosiloxane polymer), 42.5 g of $M^{Vi}D_{800}M^{Vi}$ (10 wt % of polyorganosiloxane polymer) 42.5 g of $M^{Vi}_3D_{95}T_{2.5}$ (10 wt % of polyorganosiloxane polymer), 1350.0 g of a 10.4 cstks. 60% toluene solution MQ resin, M/Q=0.7 and 2.70 wt % OH (1.2865 moles OH). Resin to polymer ratio was 1.91. The mixture was reflux dried, then 15.0 g of 1,1,3,3-tetramethyldisilazane was slowly added along with 0.40 g of bis(diisopropylamino)dimethylsilane. The mixture was agitated at room temperature, then refluxed for one hour. Excess base was neutralized with phosphoric acid to 0-10 ppm as acid, then excess toluene was removed, then the resulting composition was cooled to room temperature. The adhesive composition viscosity was 2,600 cps, 72.9% solid at 25° C., 140 ppm hydride on a 100% solids basis. Using the above calculation method the silanol-silicon hydride resin had 1.1731 moles OH (91.2 mole %) and 0.1134 moles H (8.8 mole % H) prior to refluxing. The SiH/Vi ratio was 6.2.

Part B: A series of unsaturated reactive diluent-containing compositions were formulated: 30.0 g of the adhesive from part A of example 25 was blended with 0.02 g of 3,5-dimethylhex-1-yn-3-ol, 0.4 g $MD_{15}D^H{}_{35}M$, 1.2 g unsaturated diluent as shown in Table 4, and 10 ppm platinum on solids basis from a 1800 ppm Ashby solution in toluene, then bar coated onto 75 micron polyester film at 250 microns as dry film thickness (dft) and cured at 150° C. for 10 minutes. These devolatized adhesive formulations were found to be below 100,000 cps using a Brookfiled model DV-II Viscometer.

TABLE 4

Reactive diluent-containing Formulations

| Reactive Diluents Added | Peel Adhesion, g/in | Tack, g/cm², 100 g/cm² |
|---|---|---|
| Control (no reactive diluents added) | 4090 | 230 |
| Butyl Ether | 4002 | 286 |
| Dodecyl Vinyl Ether | 3508 | 1393 |
| 4-Vinyl-1-Cyclohexene | 4432 | <100 |
| Vinylcyclohexane | 4820 | <100 |
| Vinylpropionate | 4526 | <100 |
| Poly(dimethylsiloxane), vinyl, n-butyl terminated | 3918 | 246 |

Example 26

Reactive diluents can be used to replace remaining non-reactive solvent. Since the addition of reactive diluents changes the SiH/Vi ratio, a polymethylhydrogensiloxane or mixtures of polymethylhydrogensiloxanes were added to retain the SiH/Vi ratio.

To 90.0 g of the adhesive from Example 21 was added 4.8 g of $CH_2=CH(CH_2)_{13}CH_3$ followed by removal of 8.5 g of toluene by atmospheric distillation using a nitrogen sweep to promote solvent removal at 150° C. To 20 g of the mixture was added polymethylhydrgensiloxanes of Table 5, mixed then 25 ppm platinum catalyst added. Each was coated onto 50 micron PET then cured at 135° C. for 5 minutes.

TABLE 5

Solvent free adhesive compositions

| Adhesive from Example | $MD_{15}D^H{}_{30}M$ (grams) | $MD_{17}D^H{}_4M$ (grams) | Peel Adhesion, g/in | Tack, 100 g/cm2, 1 sec. |
|---|---|---|---|---|
| Example 21 | — | — | 1930 | 593 g/cm2 |
| Example 23a | 0.3 | — | 1450 | 704 g/cm2 |
| Example 23b | — | 1.4 | 1135 | 1187 g/cm2 |
| Example 23c | 0.1 | 0.7 | 1344 | 1400 g/cm2 |

Example 27

To a 3-liter reactor was added 117.5 g of $M^{Vi}D^{Vi}{}_7D_{3200}M^{Vi}$ (28 wt % of polyorganosiloxane polymer), 217.8 g of $M^{Vi}D_{800}M^{Vi}$ (52.0 wt % of polyorganosiloxane polymer), 83.9 g of $M^{Vi}{}_3D_{95}T_{2.5}$ (20.0 wt % of polyorganosiloxane polymer), 1467.0 g of a 6.6 cstks. 60% toluene solution MQ resin, M/Q=1.1 and 2.50 wt % OH (1.2944 moles OH). The resin to polymer ratio was 2.10. The mixture was reflux dried then 17.0 g of 1,1,3,3-tetramethyldisilazane was slowly added along with 0.40 g of bis(diisopropylamino)dimethyl-silane. The mixture was agitated for 2 hours at room temperature, then refluxed for one hour. Excess base was neutralized with phosphoric acid to 0-10 ppm as acid, then excess toluene was removed, then the resulting composition was cooled to room temperature. The adhesive composition viscosity was 480 cps, 71.0% solid at 25° C., 126 ppm hydride on a 100% solids basis. Using the above calculation method the silanol-silicon hydride resin had 1.1835 moles OH (91.4 mole %) and 1109 moles H (8.6 mole % H) prior to refluxing. The SiH/Vi ratio was 3.8.

A 25.0 g sample was removed and 25 ppm platinum on solids basis was added, then bar coated onto 50 micron polyester film at 101 microns as dry film thickness (dft) and cured at 135° C. for 5 minutes. Table 6 displays the peel adhesion and Polyken Probe tack, 100 g/cm2 at 1 second contact time for this composition and with addition of various polydimethylmethylhydrogensiloxanes. As can be seen, peel adhesion and tack can be modified by formulation with external polydimethylmethylhydrogen-siloxanes.

TABLE 6

Effect of polydimethylmethylhydrogensiloxane post addition on adhesive properties

| | | 1352-10-129 | 1 | 2 | 3 | 4 | 5 | 6 | 7 | 8 | 9 | 10 | 11 |
|---|---|---|---|---|---|---|---|---|---|---|---|---|---|
| | % SiH | 50.0 | 50.0 | 50.0 | 50.0 | 50.0 | 50.0 | 50.0 | 50.0 | 50.0 | 50.0 | 50.0 | 50.0 |
| $MD^H{}_{50}M$ | 1.600% | | 0.18 | | | | | | | | | | |
| $MD_{15}D^H{}_{35}M$ | 1.040% | | | 0.7* | 1.4 | 1.65 | | | | | | | |
| $MD_{20}D^H{}_{28}M$ | 0.840% | | | | | | 0.35 | 0.7 | 1.0 | | | | |
| $MD_{24}D^H{}_{10}M$ | 0.440% | | | | | | | | | 0.35 | 0.7 | 1.0 | |
| $MD_{17}D^H{}_4M$ | 0.240% | | | | | | | | | | | | 0.9 |
| $M^HD_{90}D^H{}_2M^H$ | 0.058% | | | | | | | | | | | | |
| $M^HD_{25}M^H$ | 0.100% | | | | | | | | | | | | |
| $M^H{}_4Q_3$ | 1.030% | | | | | | | | | | | | |
| SiH/Vi = | | 3.8 | 6.3 | 10.05 | 16.3 | 18.5 | 6.3 | 8.9 | 11.0 | 5.1 | 6.5 | 7.6 | 5.7 |
| Peel Adhesion, g/in | | 2119 | 2198 | 1740 | 3343 | 1482 | 2050 | 1297 | 1128 | 2213 | 1309 | 1020 | 2797 |
| Tack, 100 g/cm2@ 1 sec., g/cm² | | 78 | 171 | 657 | 1184 | 586 | 612 | 429 | 994 | 556 | 515 | 965 | 1570 |

| | | 12 | 13 | 14 | 15 | 16 | 17 | 18 | 19 | 20 | 21 | 22 |
|---|---|---|---|---|---|---|---|---|---|---|---|---|
| | % SiH | 50.0 | 50.0 | 50.0 | 50.0 | 50.0 | 50.0 | 50.0 | 50.0 | 50.0 | 50.0 | 50.0 |
| $MD^H{}_{50}M$ | 1.600% | | | | | | | | | | | |
| $MD_{15}D^H{}_{35}M$ | 1.040% | | | | | | | | | | | |
| $MD_{20}D^H{}_{28}M$ | 0.840% | | | | | | | | | | | |
| $MD_{24}D^H{}_{10}M$ | 0.440% | | | | | | | | | | | |
| $MD_{17}D^H{}_4M$ | 0.240% | 1.3 | 1.8 | 2.7 | | | | | | | | |

TABLE 6-continued

Effect of polydimethylmethylhydrogensiloxane post addition on adhesive properties

| | | | | | | | | | | | | |
|---|---|---|---|---|---|---|---|---|---|---|---|---|
| $M^H D_{90} D^H_2 M^H$ | 0.058% | | | | 3.0 | 6.0 | 9.0 | | | | | |
| $M^H D_{25} M^H$ | 0.100% | | | | | | | 1.8 | 3.6 | 4.8 | | |
| $M^H_4 Q_3$ | 1.030% | | | | | | | | | | 0.7* | 1.4* |
| SiH/Vi = | | 6.5 | 7.5 | 9.4 | 5.3 | 6.8 | 8.3 | 5.4 | 6.9 | 7.9 | 9.98 | 16.15 |
| Peel Adhesion, g/in | | 2841 | 1945 | 1250 | 1588 | 685 | 257 | 2571 | 1243 | 920 | 1212 | 2061 |
| Tack, 100 g/cm2 @ 1 sec., g/cm² | | 1405 | 1573 | 1552 | 1568 | 1224 | 741 | 1570 | 1483 | 1067 | 791 | 1570 |

*cohesive failure

Example 28

To a 3-liter reactor was added 117.5 g of $M^{Vi} D^{Vi}_7 D_{3200} M^{Vi}$ (28 wt % of polyorganosiloxane polymer), 217.8 g of $M^{Vi} D_{800} M^{Vi}$ (52.0 wt % of polyorganosiloxane polymer), 83.9 g of $M^{Vi}_3 D_{95} T_{2.5}$ (20.0 wt % of polyorganosiloxane polymer), 838.0 g of a 10.4 cstks. 60% toluene solution MQ resin, M/Q=0.7 and 2.70 wt % OH (0.7986 moles OH), and 559.0 g of a 6.6 cstks. 60% toluene solution MQ resin, M/Q=1.1 with 2.50 wt % OH (0.4932 moles OH). The resin mixture moles OH was 1.2918. The resin to polymer ratio was 2.0. The mixture was reflux dried then 16.6 g of 1,1,3,3-tetramethyldisilazane was slowly added along with 0.40 g of bis(diisopropylamino)dimethylsilane then agitated for 2 hours at room temperature. The mixture was refluxed for one hour. Excess base was neutralized with phosphoric acid to 0-10 ppm as acid, then excess toluene was removed, then the resulting composition was cooled to room temperature. The adhesive composition viscosity was 2120 cps, 81.2% solid at 25° C., 183 ppm hydride on a 100% solids basis. Using the above calculation method the silanol-silicon hydride resin had 1.1384 moles OH (88.1 mole %) and 0.1534 moles H (11.9 mole % H) prior to refluxing. The SiH/Vi ratio was 5.4.

The adhesive composition was filtered, then 1560.0 g of filtered adhesive at 70.9% solids was combined with 55.4 g $CH_2=CH(CH_2)_{13}CH_3$, 8.1 g $MD_{15} D^H_{35} M$, 48.0 g $MD_{17} D^H_4 M$ and 246.2 g of a 10.4 cstks. 60% toluene solution MQ resin, M/Q=0.7 with 2.7 wt % silanol concentration. The mixture was heated to 160° C. with a nitrogen purge to remove volatiles. Viscosity for the solventless composition after cooling to room temperature was determined to be 80,000 cps. Hydride content was 255 ppm.

Two 25.0 g samples were removed and 25 ppm platinum on solids basis was added using the previously defined platinum catalyst and using a 10 wt % solution in toluene of Ashby catalyst which were bar coated onto 50 micron polyester film at 150 microns as dry film thickness (dft) and cured at 135° C. for 5 minutes. Table 7 displays the peel adhesion and Polyken Probe tack, 100 g/cm2 at 1-second contact time for this solventless composition using different catalysts. As can be seen, the Karstedt catalyst alters the cure adhesive properties due to the vinyl-functional siloxane carrier.

Example 29

To a 3-liter reactor was added 117.5 g of $M^{Vi} D^{Vi}_7 D_{3200} M^{Vi}$ (28 wt % of polyorganosiloxane polymer), 217.8 g of $M^{Vi} D_{800} M^{Vi}$ (52.0 wt % of polyorganosiloxane polymer), 83.9 g of $M^{Vi}_3 D_{95} T_{2.5}$ (20.0 wt % of polyorganosiloxane polymer), 838.0 g of a 10.4 cstks. 60% toluene solution MQ resin, M/Q=0.7 and 2.70 wt % OH (0.7986 moles OH), and 559.0 g of a 6.6 cstks. 60% toluene solution MQ resin, M/Q=1.1 and 2.50 wt % silanol (0.4932 moles OH). The resin mixture moles OH were 1.2918. The resin to polymer ratio was 2.0. The mixture was reflux dried, then 16.6 g of 1,1,3,3-tetramethyldisilazane was slowly added along with 0.40 g of bis(diisopropylamino)dimethylsilane then agitated for 2 hours at room temperature. The mixture was refluxed for one hour. Excess base was neutralized with phosphoric acid to 0-10 ppm as acid, then excess toluene was removed then the resulting composition was cooled to room temperature. The adhesive composition viscosity was 3090 cps, 76.9% solid at 25° C., 145 ppm hydride on a 100% solids basis. $Si^{29}$ analysis confirmed that in-situ partial capping of the silsesquioxane resin having silanol functionality (MQ resin) by using 1,1,3,3-tetramethyldisilazane occurred. Using the above calculation method the silanol-silicon hydride resin had 1.1703 moles OH (90.6 mole %) and 0.1215 moles H (9.4 mole % H) prior to refluxing. The SiH/Vi ratio was 4.1.

The adhesive composition was filtered, then 1100.0 g of filtered adhesive at 70.9% solids was combined with 22.0 g $CH_2=CH(CH_2)_{13}CH_3$, 7.3 g $MD_{15} D^H_{35} M$, 36.7 g $MD_{17} D^H_4 M$ and 100.0 g of a 10.4 cstks. 60% toluene solution MQ resin, M/Q=0.7 and 0.0953 moles OH. The mixture was heated to 160° C. with a nitrogen purge to remove volatiles. Resin to polymer ratio was 2.2. Viscosity for the solventless composition after cooling to room temperature was determined to be 114,000 cps. Hydride content was 209 ppm.

Two 25.0 g samples were removed and 25 ppm platinum on solids basis was added using the previously defined platinum catalyst and using a 10 wt % solution in toluene of Ashby catalyst which were bar coated onto 50 micron polyester film at 150 microns as dry film thickness (dft) and cured at 135° C. for 5 minutes. Table 8 displays the peel adhesion and Polyken Probe tack, 100 g/cm2 at 1-second contact time for this solventless composition using different catalysts. As can be seen, the Karstedt catalyst alters the cure adhesive properties due to the vinyl-functional siloxane carrier.

TABLE 7

Solventless Composition Cure by Different Catalysts

| | Karstadt Catalyst in vinyl-functional siloxane | Ashbey catalyst in Toluene |
|---|---|---|
| Peel Adhesion, g/in | 2714 | 2521 |
| Polyken Probe Tack, 100 g/cm² | 1263 | 667 |

TABLE 8

Solventless Composition Cured by Different Catalysts

| | Karstadt Catalyst in vinyl-functional siloxane | Ashbey catalyst in Toluene |
|---|---|---|
| Peel Adhesion, g/in | 1666 | 2158 |
| Polyken Probe Tack, 100 g/cm² | 1263 | 896 |

Example 30

To a 3-liter reactor was added 115.0 g of $M^{Vi}D^{Vi}{}_7D_{3200}M^{Vi}$ (28 wt % of polyorganosiloxane polymer), 213.0 g of $M^{Vi}D_{800}M^{Vi}$ (52.0 wt % of polyorganosiloxane polymer), 82.0 g of $M^{Vi}{}_3D_{95}T_{2.5}$ (20.0 wt % of polyorganosiloxane polymer), 1117.0 g of a 10.4 cstks. 60% toluene solution MQ resin, M/Q=0.7 and 2.70 wt % silanol (1.0644 moles OH), 250.0 g of a 6.6 cstks. 60% toluene solution MQ resin, M/Q=1.1 and 2.50 wt % silanol (0.2206 moles OH), and 50.0 g $CH_2=CH(CH_2)_{13}CH_3$. The resin mixture moles OH were 1.2850. The resin to polymer ratio was 2.0. The mixture was reflux dried, then 13.0 g of 1,1,3,3-tetramethyldisilazane was slowly added with agitation along with 0.50 g of bis(diisopropylamino)dimethylsilane at below 50° C. The mixture was refluxed for one hour. Excess base was neutralized with phosphoric acid to 0-10 ppm as acid, then the resulting composition was cooled to room temperature. The adhesive composition viscosity was 688 cps, 71.0% solid at 25° C., 132 ppm hydride on a 100% solids basis. Using the above calculation method the silanol-silicon hydride resin had 1.1568 moles OH (91.4 mole %) and 0.1083 moles H (8.6 mole % H) prior to refluxing. The SiH/Vi ratio was 0.5.

A 25.0 g sample was removed and 25 ppm platinum on solids basis was added, then bar coated onto 50 micron polyester film at 101 microns as dry film thickness (dft) and cured at 135° C. for 5 minutes. The composition cohesively failed.

To another 25.0 g sample was added 0.9 g $MD_{17}D^H{}_4M$ to increase SiH/Vi=1.0 and 25 ppm platinum on solids basis added, then bar coated onto 50 micron polyester film at 150 microns as dry film thickness (dft) and cured at 135° C. for 5 minutes. Peel adhesion was 1414 W/in and the Polyken Probe tack at 100 g/cm², 1-second contact time was 954 g/cm².

The adhesive composition was filtered and 500.0 g of this composition was combined with 8.6 g $MD_{17}D^H{}_4M$, 1.3 g $M^HD_{25}M^H$ and 65.0 g of a 10.4 cstks. 60% toluene solution MQ resin, M/Q=0.7 with 2.70 wt % silanol concentration. The mixture was then heated to 160° C. with a nitrogen purge to remove volatiles. Final resin to polymer ratio was 2.3. Viscosity for the solventless composition after cooling to room temperature was determined to be 24,800 cps. Hydride content was 378 ppm.

A 25.0 g sample were removed and 25 ppm platinum on solids basis was added, then bar coated onto 50 micron polyester film at 150 microns as dry film thickness (dft) and cured at 135° C. for 5 minutes. The peel adhesion was 2683 g/in and Polyken Probe tack, 100 g/cm² at 1-second contact time was 1399 g/cm². Cured adhesive was analyzed for unreacted hydride and found to be 38 ppm.

A comparison sample of Dow Corning® Adhesive 2013 having 554 ppm hydride and cured as above had 228 ppm unreacted hydride.

Example 31

To a 1-1 flask 400.0 g of Example 28 composition was added 12.4 g of $CH_2CHOOCC(CH_3)R'R''$ where R' and R'' are branched alkyl groups of seven carbon atoms, a vinyl ester of versatic acid commercially available as VeoVa 10 (Momentive Specialty Chemicals), 14.8 g $MD_{17}D^H{}_4M$. This composition was heated to 160° C. with a nitrogen purge to remove volatiles. Final resin to polymer ratio was 1.93. Viscosity for the solventless composition after cooling to room temperature was determined to be 151,000 cps.

A 25.0 g sample were removed and 25 ppm platinum on solids basis was added then bar coated onto 50 micron polyester film at 150 microns as dry film thickness (dft) and cured at 135° C. for 5 minutes. The peel adhesion was 2748 g/in and Polyken Probe tack, and 100 g/cm² at 1-second contact time was 1226 g/cm².

Example 32

Example 13 was repeated without the 0.15 g bis(diisopropylamino)dimethylsilane. The silanol-silicon hydride resin contained 0.2708 moles OH, 0.0018 moles H for a 99.35 moles % OH and 0.65 moles % H content. The adhesive composition viscosity was 4,800 cps and 72.4% solid at 25° C., 65 ppm hydride on a 100% solids basis. The SiH/Vi ratio was 5.2.

A 25.0 g sample was removed and 5 ppm platinum on solids basis was added, then bar coated onto 25 micron polyimide film at 97 microns as dry film thickness (dft) and cured at 150° C. for 3 minutes. Peel adhesion was: 1093 g/in.

Example 33

This example illustrates that blending with a vinyl-functional MQ resin and silicone hydride alters adhesive properties.

Adhesives from Examples 12, 16 and 31 were blended with 5 wt % on adhesive solids with $MM^{Vi}Q$ resin solids, the resin being 60% solution in xylene and vinyl content 1.4 wt %, and 1 wt % on adhesive solids basis of $MD_{17}D^H{}_4M$. These were adjusted to 75% solids mixtures, then 5 ppm platinum on solids basis was added, then bar coated onto 50 micron polyester film at 150 microns as dry film thickness (dft) and cured at 150° C. for 3 minutes. Peel adhesion (g/in) from glass and Polyken Probe tack, 100 g/cm² at 1-second contact time, g/cm² are given in Table 9.

TABLE 9

Addition of $MM^{Vi}Q$ to adhesive compositions

| Example Number | Initial Peel Adhesion | Peel Adhesion | Polyken Probe Tack |
|---|---|---|---|
| 12 (75/25) | 1163 | 3307 | 1544 |
| 12 (50/50) | 1017 | 3076 | 1475 |
| 12 (25/75) | 999 | 2513 | 1424 |
| 16 | 1243 | 2128 | 1083 |
| 31 | 1093 | 2972 | 1573 |

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. A silicone pressure sensitive adhesive composition comprising
   (A) a reaction product of a mixture comprising
      (i) a resin comprising $R^1{}_3SiO_{1/2}$ ("M") units and $SiO_{4/2}$ ("Q") units,
         wherein each $R^1$ is independently a monovalent hydrocarbon radical having from 1 to 6 carbon atoms;
         wherein the resin comprises from about 70 mol % to about 99 mol % of hydroxyl radicals and from about 1 mol % to about 30 mol % of hydride radicals, based on the total moles of the hydroxyl and the hydride radicals of the resin;

wherein the hydroxyl radicals are bonded directly to the silicon atoms of the Q units, and the hydride radicals are bonded to the silicon atoms of the Q units via —OSiHR$^5_2$ radicals, wherein R$^5$ is a monovalent hydrocarbon radical having from 1 to 6 carbon atoms; and (ii) one or more vinyl-functional polyorganosiloxanes; and (B) a hydrosilation catalyst.

2. The composition of claim 1 wherein the resin (A)(i) comprises from about 75 mol % to about 99 mol % of the hydroxide radicals, based on the total moles of the hydroxyl and the hydride radicals of the resin.

3. The composition of claim 1 wherein the resin (A)(i) comprises from about 5 mol % to about 25 mol % of the hydride radicals based on the total moles of the hydroxyl and the hydride radicals of the resin.

4. The composition of claim 1 wherein the molar ratio of the M units to the Q units in the resin (A)(i) is from about 0.6 to about 1.2 inclusive.

5. The composition of claim 1 wherein R$^1$ is methyl.

6. The composition of claim 1 wherein the resin (A)(i) is prepared by reacting a MQ resin consisting essentially of R$^1_3$SiO$_{1/2}$ ("M") units and SiO$_{4/2}$ ("Q") units with a capping agent selected from the group consisting of silazanes, disilazanes, polysilazanes, organohydrogen chlorosilanes, hydrogen functional siloxanes, and combinations thereof, and
wherein each R$^1$ is independently a monovalent hydrocarbon radical having from 1 to 6 carbon atoms, the MQ resin comprises from about 1% to about 4% by weight, based on the total weight of the MQ resin, of hydroxyl radicals bonded to the silicon atoms of the Q units, and the MQ resin does not contain hydride radicals.

7. The composition of claim 1 wherein vinyl-functional polyorganosiloxane is represented by the general formula:

$$R^2_2R^3SiO(R^2_2SiO)_x(R^2_2R^4SiO)_ySiR^3R^2_2 \quad (I)$$

wherein each R$^2$ is independently an alkyl group having from 1 to 10 carbon atoms, a cycloaliphatic group or an aryl group, each R$^3$ is independently an alkenyl group having from 2 to 10 carbon atoms, and each R$^4$ is either R$^2$ or R$^3$, and wherein x+y is at least about 520.

8. The composition of claim 1 wherein the composition further comprises a reactive diluent selected from the group consisting of vinyl ethers, vinyl carboxylates, mono-vinyl polysiloxanes, vinyl cycloaliphatics, vinyl cyclic olefinic compounds, and combinations thereof.

9. The composition of claim 1 further comprising at least one additional component selected from the group consisting of organohydrogenpolysiloxanes, MQ resins, vinyl-functional polyorganosiloxanes, and combinations thereof.

10. The composition of claim 9 wherein the organohydrogenpolysiloxane is selected from the group of compounds consisting of:
MD$_e$D$^H_f$M,
MD$^H_f$M,
MD$_e$D$^H_f$M$^H$,
M$^H$D$_e$D$^H_f$M$^H$,
M$^H$D$_e$M$^H$, and
M$^H_e$Q$_f$ wherein
M=R$_3$SiO$_{1/2}$,
M$^H$=H$_g$R$_{3-g}$SiO$_{1/2}$,
D=RRSiO$_{2/2}$,
D$^H$=R$^H$HSiO$_{2/2}$ and
Q=SiO$_{4/2}$,
wherein each R in M, M$^H$, D, and D$^H$ is independently a monovalent hydrocarbon having from one to forty carbon atoms, and wherein the subscript g is 1 and subscripts e and f may be zero or positive whereby the sum of e and f ranges from about 10 to about 100 subject to the limitation that the sum of f and g is two or greater.

11. The composition of claim 10 wherein R is methyl or phenyl.

12. The composition of claim 9 wherein the MQ resin consists essentially of R$^1_3$SiO$_{1/2}$ ("M") units and SiO$_{4/2}$ ("Q") units, wherein each R$^1$ is independently a monovalent hydrocarbon radical having from 1 to 6 carbon atoms.

13. The composition of claim 9 wherein the MQ resin is a M$^{vi}$MQ or MD$^{vi}$Q resin, wherein M is R$^7_3$SiO$_{1/2}$, M$^{vi}$ is R$^8_3$SiO$_{1/2}$, D$^{vi}$ is R$^8_2$SiO$_{2/2}$, and Q is SiO$_{4/2}$, wherein each R$^7$ is independently a monovalent hydrocarbon radical having from 1 to 6 carbon atoms, and each R$^8$ is independently R$^7$, an alkenyl radical having from 2 to 6 carbon atoms or an alkenylhydrocarbonoxy radical having from 2 to 6 carbon atoms, with the proviso that at least one R$^8$ is an alkenyl radical having from 2 to 6 carbon atoms or an alkenylhydrocarbonoxy radical having from 2 to 6 carbon atoms.

14. The composition of claim 9 wherein the vinyl-functional polyorganosiloxane is represented by the general formula:

$$R^2_2R^3SiO(R^2_2SiO)_x(R^2_2R^4SiO)_ySiR^3R^2_2 \quad (I)$$

wherein each R$^2$ is independently an alkyl group having from 1 to 10 carbon atoms, a cycloaliphatic group or an aryl group, each R$^3$ is independently an alkenyl group having from 2 to 10 carbon atoms, and each R$^4$ is either R$^2$ or R$^3$, and wherein x+y is at least about 520.

15. A process for preparing the silicone pressure sensitive adhesive composition of claim 1 comprising the steps of:
(i) reacting a MQ resin with a capping agent selected from the group consisting of silazanes, disilazanes, polysilazanes, organohydrogen chlorosilanes, hydrogen functional siloxanes, and combinations thereof, to provide a partially end-capped MQ resin,
wherein the MQ resin consists essentially of R$^1_3$SiO$_{1/2}$ ("M") units and SiO$_{4/2}$ ("Q") units, each R$^1$ is independently a monovalent hydrocarbon radical having from 1 to 6 carbon atoms, the MQ resin comprises from about 1% to about 4% by weight, based on the total weight of the MQ resin, of hydroxyl radicals bonded to the silicon atoms of the Q units, and the MQ resin does not contain hydride radicals;
wherein the partially end-capped MQ resin contains from about 70 mol % to about 99 mol % of hydroxyl radicals and from about 1 mol % to about 30 mol % of hydride radicals based on the total moles of the hydroxyl and the hydride radicals of the partially end-capped MQ resin;
(ii) reacting the partially-end capped MQ resin from step (i) with one or more vinyl-functional polyorganosiloxanes in the presence of an organic amine catalyst to provide an intermediate product; and
(iii) contacting the intermediate product from step (ii) with a hydrosilation catalyst thus preparing the silicone pressure sensitive adhesive composition of claim 1.

16. A process for preparing the silicone pressure sensitive adhesive composition of claim 1 comprising the steps of:
(a) reacting a mixture comprising
(i) a MQ resin consisting essentially of R$^1_3$SiO$_{1/2}$ ("M") units and SiO$_{4/2}$ ("Q") units, wherein each R$^1$ is independently a monovalent hydrocarbon radical having from 1 to 6 carbon atoms, the MQ resin comprises from about 1% to about 4% by weight, based on the total weight of the MQ resin, of hydroxyl radicals bonded to the silicon atoms of the Q units, and the MQ resin does not contain hydride radicals;

(ii) a capping agent selected from the group consisting of silazanes, disilazanes, polysilazanes, organohydrogen chlorosilanes, hydrogen functional siloxanes, and combinations thereof; and (iii) one or more vinyl-functional polyorganosiloxanes to provide an intermediate product; and (b) contacting the intermediate product from step (a) with a hydrosilation catalyst thus preparing the silicone pressure sensitive adhesive composition of claim 1.

17. The process of claim 16 wherein the reaction mixture of step (a) optionally comprises a coupling agent, and wherein the MQ resin is present in an amount of from about 48.0 wt % to about 75.8 wt %, the silanol capping agent is present in an amount of from about 0.56 wt % to about 0.81 wt %, the coupling agent is present in an amount of from 0% to about 0.08 wt %, and the vinyl-functional polyorganosiloxane is present in an amount of from about 22.3 wt % to about 51.1 wt %, based on the total weight of the MQ resin, the silanol capping agent, the coupling agent and the vinyl-functional polyorganoxiloxane.

18. A cured composition of claim 1.

19. An article containing a substrate having the composition of claim 1 adhered thereto.

20. The article of claim 19 wherein the composition is cured.

21. The article of claim 19 wherein the substrate is selected from the group consisting of glass, metals, porous materials, leather, fabrics, organic polymeric materials, silicone elastomers, silicone resins, painted surfaces and siliceous materials.

22. The article of claim 21 wherein the organic polymeric material is selected from the group consisting of fluorocarbon polymers, polystyrene, polyamides, polyesters and acrylic polymers.

23. The article of claim 19 wherein the article is selected from the group consisting of pressure sensitive tapes, labels, transfer films and electronic devices.

24. The article of claim 20 wherein the article is an electronic device selected from the group consisting of cell phones, GPS navigation displays, television displays, and electronic components.

* * * * *